United States Patent
Blankenship et al.

(10) Patent No.: US 9,332,516 B2
(45) Date of Patent: May 3, 2016

(54) METHOD AND SYSTEM FOR SIGNALING IN A HETEROGENEOUS NETWORK

(75) Inventors: Yufei Wu Blankenship, Kildeer, IL (US); Yi Song, Plano, TX (US); Youn Hyoung Heo, Suwon (KR); Yi Yu, Irving, TX (US); Chandra Sekhar Bontu, Nepean (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 61 days.

(21) Appl. No.: 13/408,411

(22) Filed: Feb. 29, 2012

(65) Prior Publication Data
US 2013/0039268 A1 Feb. 14, 2013

Related U.S. Application Data

(60) Provisional application No. 61/522,395, filed on Aug. 11, 2011.

(51) Int. Cl.
*H04W 56/00* (2009.01)
*H04J 11/00* (2006.01)

(52) U.S. Cl.
CPC ....... *H04W 56/0015* (2013.01); *H04J 11/0069* (2013.01); *H04J 2211/001* (2013.01)

(58) Field of Classification Search
CPC ........................................................ H04L 5/023
USPC ................. 370/252, 328, 329, 331, 336, 354; 455/434, 524
See application file for complete search history.

(56) References Cited

U.S. PATENT DOCUMENTS

| | | | |
|---|---|---|---|
| 2008/0080439 A1 | 4/2008 | Aziz et al. | |
| 2009/0010312 A1 | 1/2009 | Han et al. | |
| 2010/0008282 A1 | 1/2010 | Bhattad et al. | |
| 2010/0261472 A1* | 10/2010 | Han et al. | 455/434 |
| 2011/0149894 A1 | 6/2011 | Luo et al. | |
| 2011/0306340 A1* | 12/2011 | Lindoff et al. | 455/434 |
| 2011/0310878 A1* | 12/2011 | Lindoff et al. | 370/343 |
| 2012/0270594 A1* | 10/2012 | Parkvall et al. | 455/524 |

FOREIGN PATENT DOCUMENTS

| | | | |
|---|---|---|---|
| WO | 2008042865 A2 | 4/2008 | |
| WO | 2009078664 A2 | 6/2009 | |

OTHER PUBLICATIONS

RP-110420, "Further enhanced non-CA based ICIC for LTE", Qualcomm etc., 5 pages.
R1-103560, Qualcomm, "Enabling communication in harsh interference scenarios", 3GPP TSG-RAN WG1 #61bis, Dresden, Germany, Jun. 28-Jul. 2, 2010, 11 pages.

(Continued)

*Primary Examiner* — Andrew Chriss
*Assistant Examiner* — Peter Mak
(74) *Attorney, Agent, or Firm* — Conely Rose, P.C.; J. Robert Brown, Jr.

(57) ABSTRACT

A method at a network element operating in a wireless network, wherein the network element is configured to transmit a default cell search signal at a default position in one or more subframes, the method comprising transmitting, by the network element, an auxiliary cell search signal in addition to the default cell search signal.

23 Claims, 23 Drawing Sheets

(56) References Cited

OTHER PUBLICATIONS

R1-106165, Huawei, "Interference coordination for common channels in HetNet", 3GPP TSG-RAN WG1, #63, Jacksonville, USA, Nov. 2010, 5 pages.
R1-104064, Ericsson, "Further considerations on non-CA based enhanced ICIC", 3GPP TSG-RAN WG1 #61bis, Dresden, Germany, Jun. 28-Jul. 2, 2010, 4 pages.
R1-063049, Motorola, "Placement of P-SCH and S-SCH," 3GPP TSG RAN WG1 Meeting #47, Riga, Latvia, Nov. 6-10, 2006, 7 pages.
R1-073161, Texas Instruments, "Primary SCH Design and Performance," 3GPP TSG RAN WG1 49bis, Orlando, USA, Jun. 25-29, 2007, 7 pages.
TS 36.211 V.10.1.0, 3rd Generation Partnership Project; Technical Specification Group Radio Access Network; Evolved Universal Terrestrial Radio Access (E-UTRA); Physical Channels and Modulation (Release 10) Mar. 2011, 103 pages.
TS36.212 V10.1.0, 3rd Generation Partnership Project; Technical Specification Group Radio Access Network; Evolved Universal Terrestrial Radio Access (E-UTRA); Multiplexing and channel coding (Release 10) Mar. 2011, 76 pages.
TS36.213 V10.1.0, 3rd Generation Partnership Project; Technical Specification Group Radio Access Network; Evolved Universal Terrestrial Radio Access (E-UTRA); Physical layer procedures (Release 10) Mar. 2011, 115 pages.
TS36.331, 3rd Generation Partnership Project; Technical Specification Group Radio Access Network; Evolved Universal Terrestrial Radio Access (E-UTRA); Radio Resource Control (RRC); Protocol specification (Release 10), 290 pages.
PCT Application No. PCT/US2012/039316, International Search Report and Written Opinion of the International Searching Authority, mailed Nov. 30, 2012, 11 pages.
European Extended Search Report; Application No. 12822096.9; Mar. 19, 2015; 10 pages.
Canadian Office Action; Application No. 2,843,408; Sep. 17, 2015; 5 pages.

* cited by examiner

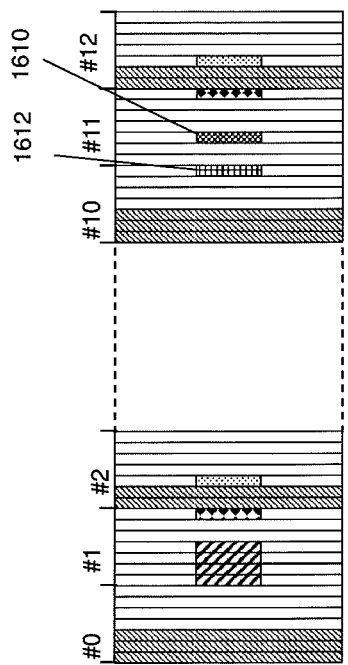
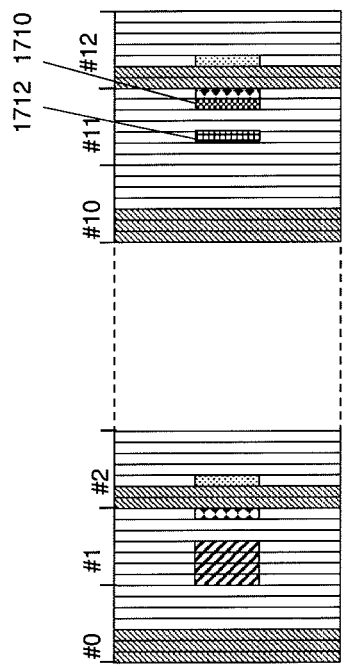
FIG. 16
FIG. 17

METHOD AND SYSTEM FOR SIGNALING IN A HETEROGENEOUS NETWORK

RELATED APPLICATIONS

The present application is a non-provisional of U.S. Provisional Application No. 61/522,395, filed Aug. 11, 2011, the entire contents of which are incorporated herein by reference.

FIELD OF THE DISCLOSURE

The present disclosure relates to heterogeneous networks and in particular relates to communication with a weaker cell in a heterogeneous network.

BACKGROUND

Heterogeneous deployment has been considered by the Third Generation Partnership Project (3GPP) Long-Term Evolution-Advanced (LTE-A) working groups as a technique to substantially improve system capacity and coverage. In a heterogeneous deployment, low power network nodes, such as pico evolved Node-Bs (eNBs) and femto eNBs, are overlaid with traditional high power eNBs which can be referred to as macro eNBs. Such macro, pico, and femto eNBs form macro, pico, and femto cells, respectively. The term "cell" refers to an area of coverage of wireless transmission by a network, such as an eNB. In some instances, each of pico cells or femto cells can have a coverage at least partially overlapping with the coverage of the macro cell. To efficiently utilize the radio spectrum, in one embodiment macro, pico and femto cells are deployed on the same carrier. However, full frequency reuse among pico, femto and macro cells could introduce severe inter-cell interference.

In particular, to improve the system capacity, range expansion has been introduced for pico eNBs where a user equipment (UE) could connect to the pico eNB even when the signal from the macro eNB is stronger. Similarly, in closed subscriber group (CSG) femto cells, the UE may receive a stronger signal from the femto cell than from the macro eNB. However, if the UE is not part of the closed subscriber group, the UE may need to connect to the macro eNB. The weaker cell that the UE is connecting to is referred to herein as the victim cell. In such an instance, the stronger cell that the UE is not connecting to can be referred to as the aggressor cell in the context of this document.

One alternative to reduce interference from a victim cell is almost blank sub-frame (ABS) based enhanced inter-cell interference coordination (eICIC). In this alternative, the higher powered cell blanks out transmission or lowers transmitting power on certain sub-frames to enable successful data transmission from the lower powered (victim) cell. However, the almost blank sub frame still contains cell specific reference signals (CRS) and also, if the primary synchronization signal (PSS)/secondary synchronization signal (SSS)/physical broadcast channel (PBCH)/system information block 1 (SIB1)/paging/positioning reference signal (PRS) coincide with the ABS, they are transmitted in the ABS, with the associated physical downlink control channel when SIB1/paging is transmitted.

However, due to the interference from the aggressor cell, the UE may not be able to reliably detect basic signals such as PSS, SSS and PBCH from the weaker cell.

DESCRIPTION OF THE DRAWINGS

The present disclosure will be better understood with reference to the drawings in which:

FIG. 16 is a block diagram of a portion of a radio frame in TDD showing the addition of an auxiliary PSS and SSS in a different location from those of FIGS. 14 and 15 according to yet another embodiment;

FIG. 17 is a block diagram of a portion of a radio frame in TDD showing the addition of an auxiliary PSS and SSS in a different location from those of FIGS. 14-16 according to yet another embodiment;

Appendix I is also referred to.

DETAILED DESCRIPTION

The present disclosure provides a method at a network element operating in a wireless network, wherein the network element is configured to transmit a default cell search signal at a default position in one or more subframes, the method comprising transmitting, by the network element, an auxiliary cell search signal in addition to the default cell search signal at a position other than the default position.

The present disclosure further provides a method at a user equipment ('UE') operating in a wireless network having a default cell search signal at a default position in one or more subframes, the method comprising detecting, by the UE, an auxiliary cell search signal; and utilizing, by the UE, information within the auxiliary cell search signal to obtain system information for the wireless network.

The present disclosure further provides a network element operating in a wireless network, wherein the network element is configured to transmit a default cell search signal at a default position in one or more subframes, comprising a processor; and a communications subsystem, wherein the processor and communications subsystem cooperate to transmit, by the network element, an auxiliary cell search signal in addition to the default cell search signal to user equipment operating in a wireless network.

The present disclosure further provides a user equipment operating in a wireless network having a default cell search signal at a default position in one or more subframes, the user equipment comprising a processor; and a communications subsystem, wherein the processor and communications subsystem cooperate to detect, by the UE, an auxiliary cell search signal; and utilize, by the UE, information within the auxiliary cell search signal to obtain system information for the wireless network.

The present disclosure is described below with regard to the 3GPP LTE-A standards, and in some embodiments to Release 11 of the 3GPP LTE-A standards. However, the present disclosure is not limited to this standard, and could be applied to all versions of the LTE standards and to other similar radio technologies.

Figure 1:
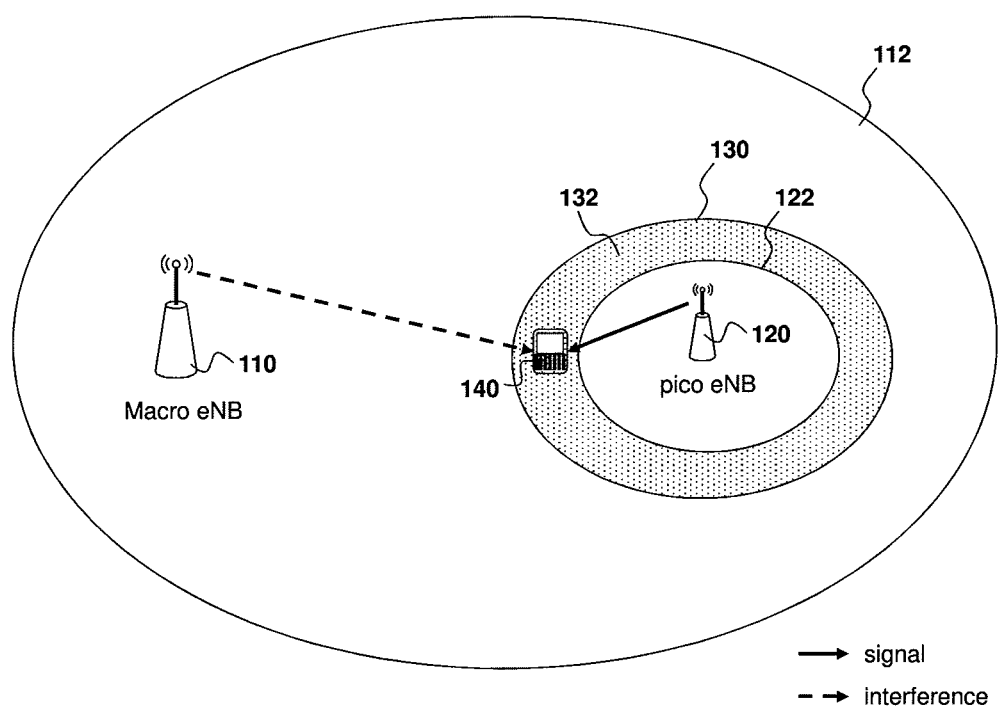
FIG. 1 is a block diagram showing a conventional heterogeneous network with a pico cell and macro cell, the pico cell having a range expansion area.

In 3GPP LTE-A, heterogeneous deployment has been considered to improve system capacity and cell coverage. In heterogeneous deployment, low transmit power network nodes such as pico eNBs and femto eNBs are placed within traditional high transmit power macro cells. Further, for pico eNBs, range expansion can be used to offload traffic from the macro to the pico. Reference is now made to FIG. 1.

In FIG. 1, a macro eNB 110 has a coverage area shown by reference numeral 112. In order to offload UEs from macro eNB 110, a pico eNB 120 may be introduced within area 112. Pico eNB has a coverage area shown by reference numeral 122.

In order to offload more UEs to the pico eNB 120, range expansion can be utilized to increase the serving area of pico eNB 120 from area 122 to the area shown by reference numeral 130. In the range expansion area 132 between reference numerals 130 and 122, the UE 140 communicates with the pico eNB 120 even if the signal from macro eNB 110 is stronger. While this offloads more UEs to the pico than when range expansion is not used, the UE in the range expansion area connected to pico eNB 120 may see significant interference form macro eNB 110.

Figure 2:
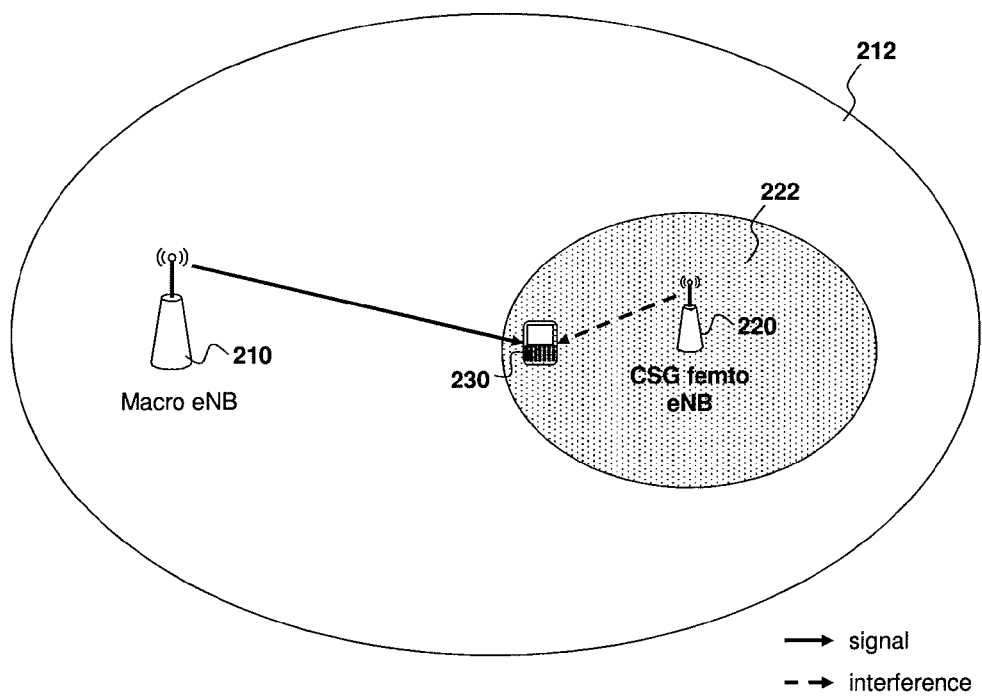
FIG. 2 is a block diagram showing a conventional heterogeneous network with a closed subscriber group femto cell and a macro cell.

Similarly, interference conditions can exist for femto cells with closed subscriber group (CSG) access. Reference is now made to FIG. 2.

In FIG. 2, macro eNB 210 serves an area shown by reference numeral 212. A CSG femto eNB 220 serves an area shown by reference numeral 222. However, the CSG femto cell is a closed group and only allows communication from designated or member UEs. If a non-member UE 230 is within area 222, that non-member 230 still needs to be serviced by macro eNB 210. The non-member UE 230 would however see significant interference from the femto eNB 220.

Figure 3:
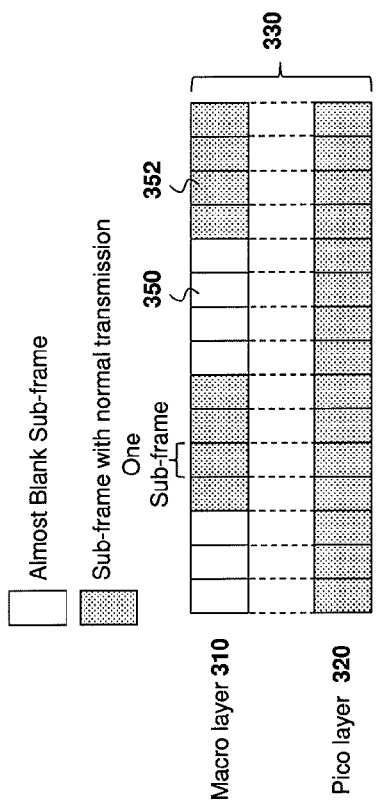
FIG. 3 is a timing diagram showing a conventional method of transmissions of almost blank sub frames in a pico-macro case.
Figure 4:
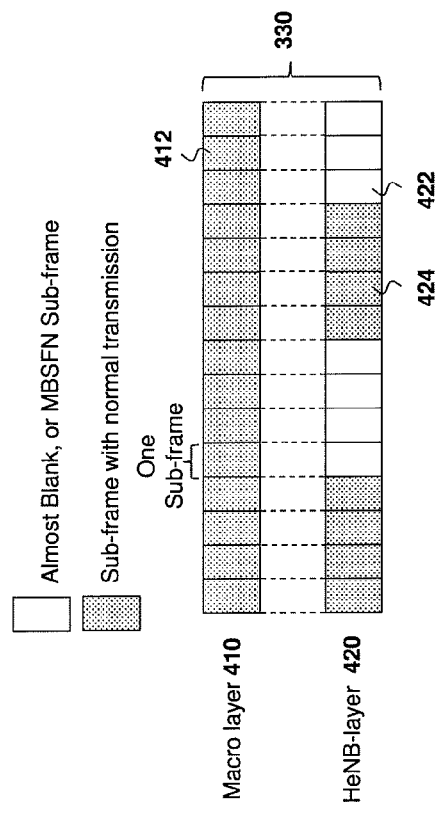
FIG. 4 is a timing diagram showing a conventional method of transmissions of almost blank sub frames in a femto-macro case.

In order to overcome interference issues with such heterogeneous deployment, almost blank sub-frame (ABS) based enhanced inter-cell interference coordination (eICIC) schemes have been adopted in Release 10 of the LTE standards to solve the interference issues. Reference is now made to FIGS. 3 and 4, where FIG. 3 shows the ABS deployment for the embodiment of FIG. 1 while FIG. 4 shows the ABS deployment for the embodiment of FIG. 2.

As shown in FIGS. 3 and 4, the ABS sub-frames are configured on the aggressor cell. In particular, referring to FIG. 3, in the pico cell RE case, the interfering signal comes from the macro eNB and thus the ABS is configured on the macro eNB.

Similarly, for the femto case of FIG. 4, the interference comes from the femto cell and thus ABS is configured on the femto eNB.

During an ABS, the aggressor cell blanks the transmissions of control and data or transmits with significantly reduced power. However, during an ABS the aggressor cell may have some transmissions for essential signals, as explained below. ABS provides interference free or almost interference free resources to victim cells so that pico UEs in the RE areas or victim macro UEs in the femto coverage areas can be scheduled to communicate with their serving nodes.

Thus, in particular, referring to FIG. 3 a macro eNB 310 and pico eNB 320 communicate over sub-frames generally designated as 330. Pico eNB 320 utilizes sub-frames with normal transmission whereas the macro eNB 310 intersperses almost blank sub-frames 350 within normal transmission sub-frames 352.

Similarly, for FIG. 4, macro eNB 410 transmits sub-frames with normal transmissions as shown by reference numeral 412. Femto eNB 420 transmits almost blank or Multicast/Broadcast over Single Frequency Network (MBSFN) sub-frames 422 interspersed among the sub-frames with normal transmission 424.

As indicated above, however, the almost blank sub-frames are not completely blank and include some signaling. For example, if the primary synchronization signal (PSS), the secondary synchronization signal (SSS), physical broadcast channel (PBCH), system information block 1 (SIB1), paging, or positioning reference signal (PRS) coincide with an almost blank sub-frame, they are transmitted in the almost blank sub-frame. Further, the associated Physical Downlink Control Channel (PDCCH) is transmitted when SIB1 or paging is transmitted. In the embodiments described herein, the term "synchronization signal" can be interchangeably used with "synchronization sequence."

The cell-specific reference signal (CRS) is also transmitted on ABS to avoid impacts to Release 8 or 9 LTE standard UE channel estimation and radio resource management (RRM), radio link management (RLM) and channel quality indicator measurements for these UEs. To further reduce the interference from CRS in the data region, an ABS could be configured as an MBSFN sub-frame wherever possible. However, for frequency division duplex (FDD), sub-frame numbers 0, 4, 5 and 9 cannot be MBSFN sub-frames due to PSS/SSS/PBCH/SIB1/paging. Similarly, sub-frames 0, 1, 2, 5 and 6 cannot be MBSFN sub-frames in time division duplex (TDD).

Synchronization Signals

As indicated above, the PSS and SSS are basic signals transmitted by an eNB. The signals are used to assist in cell search and are transmitted on the downlink.

Although the PSS and SSS signals have the same detailed structure, the time domain positions of the synchronization signals within the frame may differ somewhat depending on the mode of operation, either frequency division duplex (FDD) or time divisional duplex (TDD).

In one embodiment, there are, for example, 504 unique physical layer cell identities. The physical layer cell identities are grouped into, for example, 168 unique physical layer cell identity groups, each group containing three unique identities. The grouping is such that each physical layer cell identity is a part of one and only one physical layer cell identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

The two PSSs transmitted by a cell within a radio frame may be identical. The PSS of a cell may take three different sequences, as determined by $N_{ID}^{(2)}$ of the cell. Once the UE has detected and identified the PSS of the cell, the UE has identified at least two things. The first is the millisecond timing of the cell and thus also the position of the SSS which has a fixed offset relative to the PSS. The second is the $N_{ID}^{(2)}$, which is the cell identity within the cell identity group.

Once the PSS is detected, the UE can attempt to detect the SSS. Each SSS can take 168 different sequences corresponding with 168 different cell identity groups $N_{ID}^{(1)}$.

The set of sequences valid for two SSS (SSS1, SSS2) within a radio frame are different. Thus, from the detection of a single SSS, the UE can determine whether SSS1 or SSS2 has been detected and thus determine the radio frame timing.

From the SSS, the terminal can find at least two things. The first is the radio frame timing, which has two different alternatives given the position of the PSS. The second is the $N_{ID}^{(1)}$, which is the cell identity group and is one of 168 alternatives.

Once the terminal has acquired radio frame timing and physical later cell identity, it has identified the cell specific reference signal and can begin channel estimation. The cell may then decode the broadcast channel transport channel which carries the most basic set of system information.

With regard to synchronization signals for the case of FDD, the PSS can be transmitted within the last symbol of the first time slot of the sub frames 0 and 5, which corresponds to slots 0 and 10, while the SSS is transmitted within the second last symbol of the same slots. In other words, the SSS is transmitted in the symbol just prior to the PSS.

Figure 5:
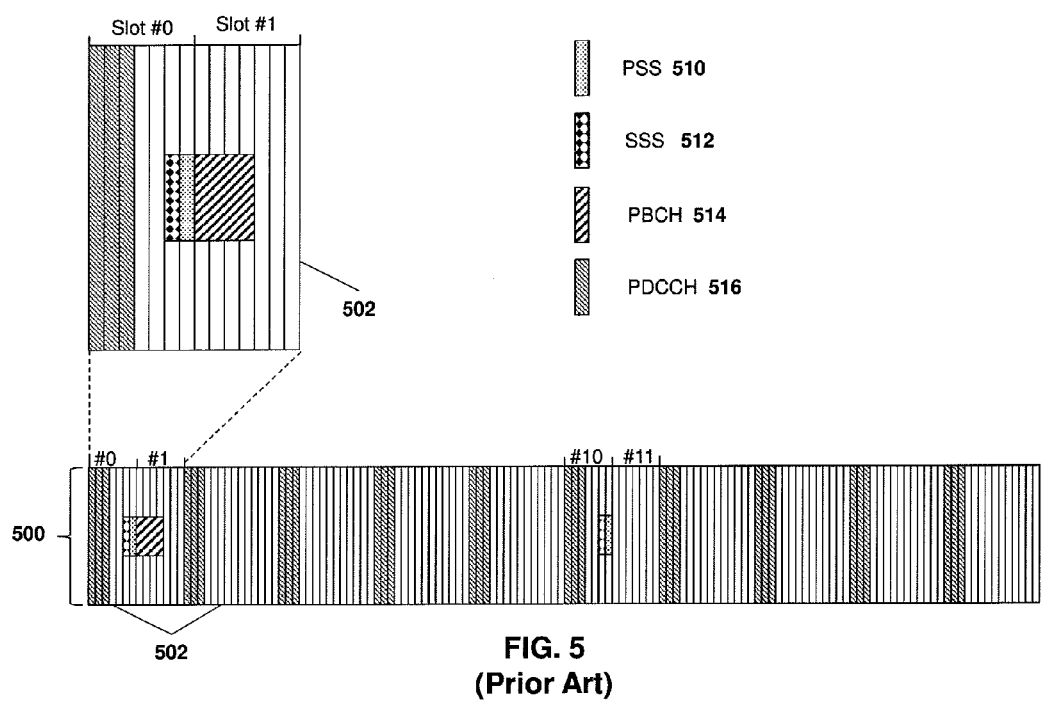
FIG. 5 shows a conventional radio frame with cell selection signals for FDD.

Reference is now made to FIG. 5, which shows a radio frame 500 having a plurality of sub frames 502. Each sub frame 502 has two slots. A first sub frame 502 is shown expanded in the example of FIG. 5.

As seen in the example of FIG. 5, PSS 510 is found in the last OFDM symbol of slot 0 and also the last OFDM symbol of slot 10. PSS occupies the central 62 sub-carriers.

SSS 512 immediately precedes the PSS 510 and thus is found in the second last OFDM symbol of slot 0 and the second last OFDM symbol of slot number 10. Similar to PSS, SSS occupies the central 62 sub-carriers.

Further, the PBCH 514 occupies the first four OFDM symbols of slot number 1 and the PDCCH 516 occupies the first three OFDM symbols of each sub frame 502. PBCH occupies the central 72 sub-carriers.

For synchronization signals for TDD, the PSS is transmitted within the third OFDM symbol of sub frame 1 and 6. The SSS is transmitted in the last OFDM symbol of sub frame 0 and 5. Thus, the SSS is transmitted three OFDM symbols ahead of the PSS. Both PSS and SSS occupy the central 62 sub-carriers.

Figure 6:
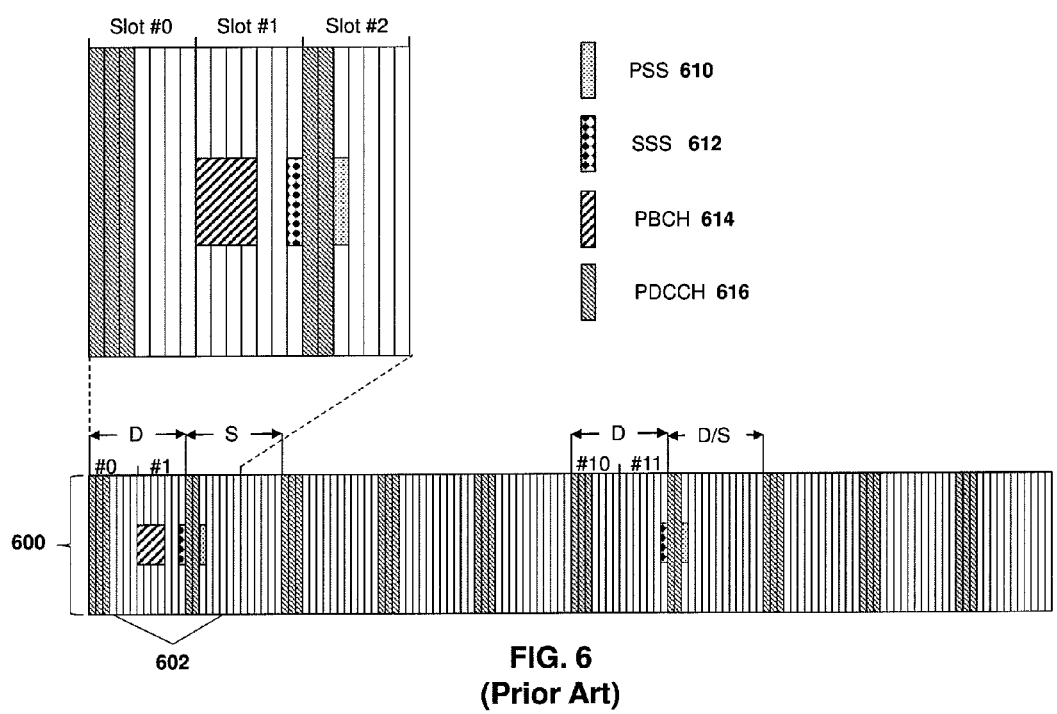
FIG. 6 shows a conventional radio frame with cell selection signals for TDD.

Reference is now made to FIG. 6, which shows a TDD radio frame 600 having a plurality of sub frames 602.

As seen in FIG. 6, PSS 610 is transmitted in the third OFDM symbol of sub-frame 1 (the third OFDM symbol of slot number 2) and the third OFDM symbol of sub-frame 6 (the third symbol of slot number 12).

SSS 612 is transmitted in the last symbol of sub frame 0 (the last symbol of slot number 1) and the last symbol of sub frame 5 (the last symbol of slot number 11).

Further, the PBCH 614 is transmitted within the first four symbols of slot number 1 and the PDCCH 616 is transmitted within the first three symbols of every sub frame with the exception of the sub frames that transmit PSS 610, in which case only two symbols contain the PDCCH. PBCH occupies the central 72 sub-carriers.

As used herein, the PSS, SSS and PBCH may be collectively or individually referred to as a cell search signal. In other embodiments, the term "cell search signal" can refer to any other signal that is suitable for use in cell search. Further, PSS, SSS or PBCH signals defined in the Release 8, 9 and 10 standards for LTE may be referred to as default or primary cell search signals, while new PSS, SSS or PBCH signals as provided for in the present disclosure may be referred to as auxiliary cell search signals.

For network selection, in LTE-A heterogeneous networks, a UE may communicate with a weaker cell. Such communication may include, for example, communication with a pico cell when a UE is in the range expansion area or a non-member UE in the coverage area of a CSG cell. While the aggressor cell blanks the transmission or reduced transmit power as much as possible during ABSs, PSS/SSS/PBCH/SIB1/paging/PRS still is transmitted during these ABSs to avoid impacts on legacy UEs.

Without a sub-frame offset, the PSS/SSS/PBCH of an aggressor cell may collide with the PSS/SSS/PBCH of a victim cell. In the present disclosure, aggressor cell is the cell having stronger signal and victim cell is the cell having a weaker signal. Thus, the PSS/SSS/PBCH transmission from the aggressor cell degrades the signal reception at the UE in the victim cell, for example, in the range expansion area.

In accordance with some embodiments, the present disclosure provides for the insertion of an auxiliary PSS in a victim cell and/or the insertion of an auxiliary SSS in a victim cell. In order to avoid confusion with existing PSS and SSS, the present disclosure provides for various alternatives. These include utilizing new Zadoff-Chu sequences in the auxiliary PSS to avoid confusion with existing PSS. Further, confusion may be avoided in some embodiments through the introduction of new sequences to be used for the auxiliary SSS. Further, in some embodiments, a new relative position can be used between the auxiliary PSS and SSS.

In accordance with one embodiment of the present disclosure, an auxiliary PBCH is inserted in a victim cell to provide master information block (MIB) information.

Further, in accordance with one embodiment, configuration information of the auxiliary PSS/SSS/PBCH may be exchanged between neighboring cells via backhaul or X2 interface.

In a further embodiment, some of the resource blocks of the aggressor cell may be blanked to protect the auxiliary PSSS/SS/PBCH of the victim cell.

Further, in accordance with one embodiment, the configuration of the auxiliary PSS/SSS/PBCH between neighboring cells may be coordinated to avoid mutual interference.

In accordance with a further embodiment, signaling from the eNB to the UE may be used to trigger the UE to perform cell searches using the auxiliary PSS/SSS/PBCH.

As will be appreciated by those in the art, the UE utilizes the same procedure to perform its initial cell search and cell selection as with non-initial cell searches or cell reselections. A UE does not only carry out cell searches at power up, but also may continuously search for, synchronized to, and estimate reception quality of neighboring cells to support mobility. The reception quality of neighboring cells in relation to reception quality of the current cell is then evaluated to consider if a handover or cell selection/reselection should be carried out.

When creating an auxiliary PSS/SSS/PBCH signaling, various embodiments of the present disclosure utilize the design considerations below. However, these are not meant to be limiting and other options are possible.

In a first embodiment, an auxiliary PSS/SSS and an auxiliary PBCH may respectively reside within central 62 and 72 sub carriers but in different Orthogonal Frequency Division Multiplexing (OFDM) symbols than default PSS/SSS/PBCH. When a UE first performs a cell search, the UE does not know the cell bandwidth. Thus, the UE can assume a cell bandwidth equal to a minimum possible downlink bandwidth. This may be, for example, six resource blocks corresponding to 72 sub carriers. From the decoded MIB on PBCH, the terminal is then informed of the actual downlink cell bandwidth and can adjust the receiver bandwidth accordingly. Thus, in LTE, the PSS/SSS and PBCH may respectively occupy the central 62 and 72 sub carriers (i.e. around the zero-frequency subcarrier). To allow the UE to continue to operate regardless of actual bandwidth, auxiliary PSS/SSS and auxiliary PBCH may respectively reside in the central 62 and 72 sub carriers as well. However, in this case, since the PSS/SSS/PBCH reside in the same resource elements (RE) as the default PSS/SSS/PBCH, the auxiliary PSS/SSS/PBCH maybe transmitted at different times than the default PSS/SSS/PBCH. This may be in different sub-frames or different OFDM symbols.

In a second embodiment, auxiliary PSS and SSS are located close to each other so that coherent detection of SSS is possible while SSS can be detected both coherently and non-coherently. This may lead to less cell search time and higher accuracy in some embodiments by coherent detection using channel estimation available after detecting PSS. The above may be more relevant when the UE is moving fast.

In a third embodiment, the auxiliary PSS should not confuse legacy UEs about the five millisecond timing. As used herein, the term legacy UE refers to user equipment that implements Release 8, 9 or 10 of the LTE specifications.

UEs that implement the present embodiments would be aware of the auxiliary PSS used in conjunction with existing PSS. However, legacy UEs may not be aware of this fact and thus incorrectly identify the five millisecond timing according to the auxiliary PSS.

In another embodiment, the auxiliary SSS should not confuse a legacy UE about radio frame timing. Similar to the concern with regard to the PSS, UEs implementing the present embodiments may be aware that the auxiliary SSS is used in conjunction with existing SSS. However, legacy UEs may not be aware of the auxiliary SSS and should not, in one embodiment, incorrectly identify the radio frame timing according to the auxiliary SSS.

In yet another embodiment, the auxiliary PSS and SSS may be located close to existing PSS and SSS so that UEs with a small search window may detect the synchronization signals.

In yet another embodiment, the physical downlink shared channel (PDSCH) may be controlled for the transmission of the same cell and the neighbor cell to protect the auxiliary PSS/SSS/PBCH. For example, the PDSCH of a legacy UE may be scheduled on different resource blocks than the ones on which auxiliary PSS, SSS, and/or PBCH are transmitted. For example, three resource blocks on either side of the zero-frequency sub carrier. One reason why a whole physical resource block (PRB) is not scheduled instead muting overlapping resource elements with the auxiliary PSS, SSS and/or PBCH is because legacy UEs expect data over resource blocks assigned to the auxiliary PSS, SSS and/or PBCH.

In accordance with the above embodiments, various alternatives can be proposed herein.

Full-Size Auxiliary PSS/SSS

In a first alternative, one way to avoid confusion between auxiliary PSS/SSS and existing PSS/SSS is the introduction of a new Zadoff-Chu sequence for auxiliary PSS. In this case, there may be no need to introduce new sequences for SSS because SSS may be detected after the PSS is detected. Thus, the introduction of a new auxiliary PSS and SSS may not confuse legacy UEs.

The sequence of length N used for default PSS is generated from a frequency domain Zadoff-Chu sequence in accordance with:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (1)$$

Where the Zadoff-Chu route sequence index u is given in accordance with Table 1 below.

TABLE 1

Root indices for the PSS

| $N_{ID}^{(2)}$ | Root index u |
|---|---|
| 0 | 25 |
| 1 | 29 |
| 2 | 34 |

In accordance with Table 1, the selection of u is performed such that $u_1+u_2=N$, where N=63 is the length of the Zadoff-Chu sequence. With this relationship, the resulting time domain waveform of the PSS ($u_2$) is a complex conjugate of the PSS ($u_1$). In other words, the sequences have time domain complex conjugate symmetry. This allows approximately a one third reduction in complexity of PSS detection since the correlation between the received signal and the third PSS can be obtained from the correlation with the second PSS and thus two PSSs can be detected with a single correlater. Thus, when selecting auxiliary PSS, the root indices may satisfy $u_1+u_2=N$.

In another alternative, root indices 23, 40 and 41 may be used. These root indices have good auto-correlation and cross-correlation properties. Further, in one embodiment, resulting sequences with new indices may have good cross-correlation properties with corresponding existing Zadoff-Chu sequences.

Reference is now made to Table 2, which shows three indices $u'_i$ one for each $u_i$. In other words, a one to one mapping exists between existing Zadoff-Chu sequences of PSS and auxiliary sequences. Thus, for a cell with identifier $N_{ID}^{(2)}=i$, two PSS sequences are used, with the existing PSS having an index $u_i$ and the auxiliary PSS having an index $u'_i$.

In one embodiment, the cross-correlation between the auxiliary PSS with the root index u' and the existing PSS with root index u is by selecting u' such that |u'−u| is prime to the length of the Zadoff-Chu sequence. For example, this may be 63. The values for $u'_0$, $u'_1$, and $u'_2$ may be 41, 40 and 23 in one embodiment. These values are used as an example, and other values that give sequences with good correlation properties may also be used.

TABLE 2

Root indices for the auxiliary PSS

| $N_{ID}^{(2)}$ | Root index u | Auxiliary Root index u' |
|---|---|---|
| 0 | 25 | $u'_0$ |
| 1 | 29 | $u'_1$ |
| 2 | 34 | $u'_2$ |

Alternatively, one auxiliary PSS sequence may be configured for a victim cell, as long as there is only one victim cell transmitting the auxiliary PSS in a coverage area. For example, if a pico cell is surrounded by multiple macro cells, one auxiliary PSS is configured by the pico cell. This scenario may be possible if existing PSS signaling can be relied on for detecting $N_{ID}^{(2)}$ after a correct time and frequency synchronization is provided, or if the victim cell is the neighboring cell and the serving cell gives cell identifier information of the victim cell so that the UE only needs the auxiliary PSS sequence to detect a time and frequency synchronization. Using one sequence for the auxiliary PSS, the auxiliary PSS may only provide the time and frequency synchronization. This helps to reduce receiver complexities of any UE implementing the present embodiments.

Any sequence with good properties other than root indexes 25, 29 and 34 from Table 1 above may be used. In one embodiment, at cell-j, a Zadoff-Chu sequence with a root index u' may be selected u' such that |u'−$u_i$| is a prime number of 63 where $u_i$ is the route index of PSS transmitted by cell- for all i≠j which are the closest neighboring cells to cell-i. $u_i$ may include the roots of Zadoff-Chu sequences used as primary and auxiliary PSSs. Further, on the UE side, the UE may monitor the auxiliary PSS sequence when certain conditions are met or the eNB could signal to the UE. For example, in normal operations, the UE could perform legacy PSS/SSS detection. When the UE is close to the range expansion area or close to a femto cell, the UE may start to detect the new auxiliary sequence. For initial access such as when the UE is originally in an idle mode, detection of whether to use the auxiliary PSS/SSS or not may be determined by the UE internally based on implementation factors. For example, one implementation may be that the UEs in idle mode always perform cell search using the auxiliary PSS/SSS enabled.

Figure 7:
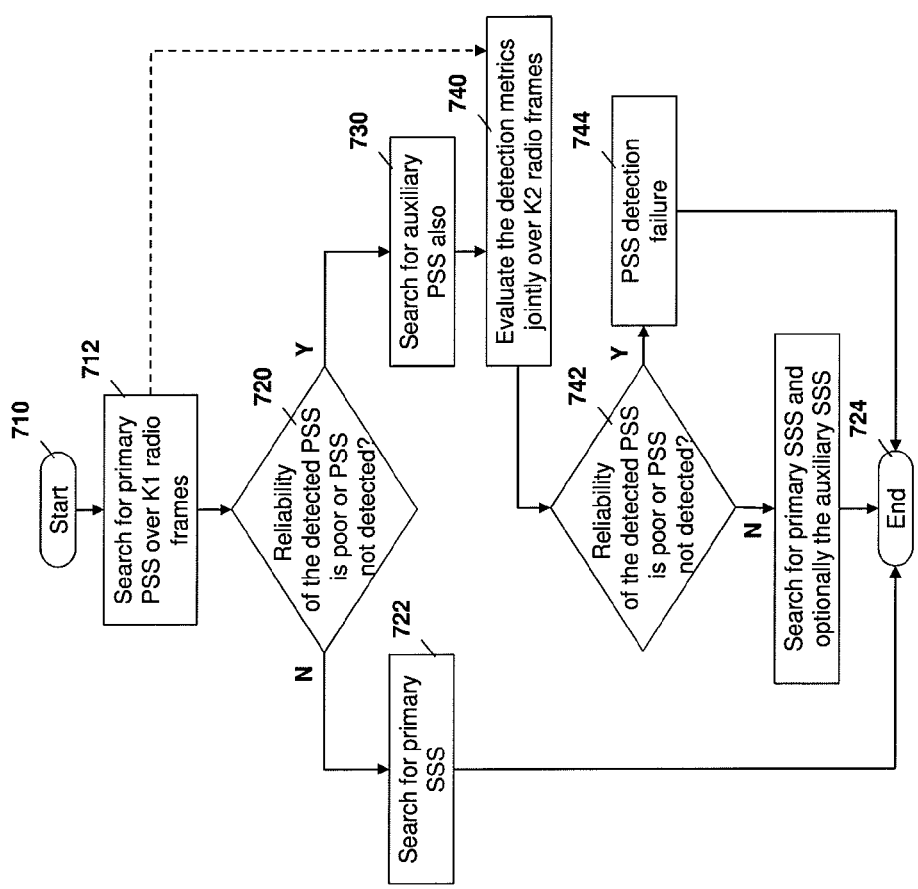
FIG. 7 is a process diagram showing a process at a mobile device for detecting PSS according to one embodiment.

Reference is now made to FIG. 7. In FIG. 7, a UE, during an initial cell search may sense low reliability of PSS measurements. In such cases, the UE may try to detect auxiliary PSS at a redefined location within the radio frame and combine the detection metrics after proper scaling. For example, the UE can combine the correlation metrics collected at different time instances after scaling with a reliability value. The reliability value may, for example, depend on the signal to interference power ratio observed over the respective correlation measurements. The frequency offset, slot boundaries and physical layer identifiers may be determined from the combined metric.

The process of FIG. 7 starts at block 710 and proceeds to block 712 in which a search is made for a primary PSS over K1 radio frames.

The process then proceeds to block 720 to check whether the reliability of the detected PSS is poor or if the PSS is not detected.

If the reliability is not poor and a PSS is detected, the process proceeds to block 722 in which the UE performs a search for a primary SSS. The process then proceeds to block 724 and ends.

Conversely, if the reliability of the detected PSS is poor or if the PSS is not detected, the process proceeds from block 720 to block 730 in which the UE also searches for the auxiliary PSS.

From block 730 the process proceeds to block 740 in which the detection metrics for the primary PSS and the auxiliary PSS are evaluated jointly over K2 radio frames.

The process then proceeds to block 742 in which a check is made to determine whether the evaluated metrics from block 740 are reliable. In other words, the check at block 742 checks whether the reliability of the detected PSS is poor or if PSS is not detected. If the reliability is poor or the PSS is not detected the process proceeds to block 744 in which PSS detection failure is noted and the process then proceeds to block 724 and ends.

Conversely, if the reliability of the detected PSS is not poor and if PSS is detected at block 742 the process proceeds to block 750 in which a search for primary SSS and optionally an auxiliary SSS is also done.

From block 750 the process proceeds to block 724 and ends.

Thus, from FIG. 7, a UE implementing the present embodiments is aware of the auxiliary PSS transmission and may also search for the auxiliary PSS in the case of a determination that the detection of the primary PSS is not reliable. Optionally, a UE may attempt to detect the primary SSS with the timing and frequency offset derived based on primary PSS detection before deciding whether to detect the auxiliary PSS. Based on the severity of the radio channel conditions, the detection of the PSS and SSS may be performed over multiple radio frames as illustrated. If a UE implementing the present embodiments is searching for both the primary and auxiliary PSS, the number of radio frames K2 over which the detection metric is observed may be reduced compared to K1.

New Sequences for Auxiliary SSS

In the embodiment discussed above, one way to avoid confusion between auxiliary PSS/SSS and existing PSS/SSS is to introduce a new Zadoff-Chu sequence for the auxiliary PSS. In an alternative embodiment, new sequences may be defined for the auxiliary SSS to pair with the PSS.

Currently, two SSS parameter $(m_0, m_1)$ is specified for each $N_{ID}^{(1)}$. New SSS sequences can be defined by choosing a different mapping table between between $N_{ID}^{(1)}$ and $(m_1, m_1)$. For example, the indices $m_0$ and $m_1$ can be derived from the physical-layer cell-identity group $N_{ID}^{(1)}$ with a shift $\delta$ compared to the existing relationship. With a shift $\delta$ to $N_{ID}^{(1)}$, the parameters $(m_0, m_1)$ can be generated in accordance with the following:

$$m_0 = m' \bmod 31 \quad (2)$$

$$m_1 = (m_0 + \lfloor m'/31 \rfloor + 1) \bmod 31$$

$$m' = N_{ID}^{(1)} + q(q+1)/2 + \delta,$$

$$q = \left\lfloor \frac{N_{ID}^{(1)} + q'(q'+1)/2 + \delta}{30} \right\rfloor, \quad q' = \lfloor (N_{ID}^{(1)} + \delta)/30 \rfloor$$

If $\delta$ is 1, the mapping between $N_{ID}^{(1)}$ and $(m_0, m_1)$ is provided in Table 3 below.

TABLE 3

Mapping Between $N_{ID}^{(1)}$ and $m_0$ and $m_1$

| $N_{ID}^{(1)}$ | $m_0$ | $m_1$ |
|---|---|---|
| 0 | 1 | 2 |
| 1 | 2 | 3 |
| 2 | 3 | 4 |
| 3 | 4 | 5 |
| 4 | 5 | 6 |
| 5 | 6 | 7 |
| 6 | 7 | 8 |
| 7 | 8 | 9 |
| 8 | 9 | 10 |
| 9 | 10 | 11 |
| 10 | 11 | 12 |
| 11 | 12 | 13 |
| 12 | 13 | 14 |
| 13 | 14 | 15 |
| 14 | 15 | 16 |
| 15 | 16 | 17 |
| 16 | 17 | 18 |
| 17 | 18 | 19 |
| 18 | 19 | 20 |
| 19 | 20 | 21 |
| 20 | 21 | 22 |
| 21 | 22 | 23 |
| 22 | 23 | 24 |
| 23 | 24 | 25 |
| 24 | 25 | 26 |
| 25 | 26 | 27 |
| 26 | 27 | 28 |
| 27 | 28 | 29 |
| 28 | 29 | 30 |
| 29 | 0 | 2 |
| 30 | 1 | 3 |
| 31 | 2 | 4 |
| 32 | 3 | 5 |
| 33 | 4 | 6 |
| 34 | 5 | 7 |
| 35 | 6 | 8 |
| 36 | 7 | 9 |
| 37 | 8 | 10 |
| 38 | 9 | 11 |
| 39 | 10 | 12 |
| 40 | 11 | 13 |
| 41 | 12 | 14 |
| 42 | 13 | 15 |
| 43 | 14 | 16 |
| 44 | 15 | 17 |
| 45 | 16 | 18 |
| 46 | 17 | 19 |
| 47 | 18 | 20 |
| 48 | 19 | 21 |
| 49 | 20 | 22 |
| 50 | 21 | 23 |
| 51 | 22 | 24 |
| 52 | 23 | 25 |
| 53 | 24 | 26 |
| 54 | 25 | 27 |
| 55 | 26 | 28 |
| 56 | 27 | 29 |
| 57 | 28 | 30 |
| 58 | 0 | 3 |
| 59 | 1 | 4 |
| 60 | 2 | 5 |
| 61 | 3 | 6 |
| 62 | 4 | 7 |
| 63 | 5 | 8 |
| 64 | 6 | 9 |
| 65 | 7 | 10 |
| 66 | 8 | 11 |
| 67 | 9 | 12 |
| 68 | 10 | 13 |
| 69 | 11 | 14 |
| 70 | 12 | 15 |
| 71 | 13 | 16 |
| 72 | 14 | 17 |
| 73 | 15 | 18 |
| 74 | 16 | 19 |
| 75 | 17 | 20 |

TABLE 3-continued

Mapping Between $N_{ID}^{(1)}$ and $m_0$ and $m_1$

| $N_{ID}^{(1)}$ | $m_0$ | $m_1$ |
|---|---|---|
| 76 | 18 | 21 |
| 77 | 19 | 22 |
| 78 | 20 | 23 |
| 79 | 21 | 24 |
| 80 | 22 | 25 |
| 81 | 23 | 26 |
| 82 | 24 | 27 |
| 83 | 25 | 28 |
| 84 | 26 | 29 |
| 85 | 27 | 30 |
| 86 | 0 | 4 |
| 87 | 1 | 5 |
| 88 | 2 | 6 |
| 89 | 3 | 7 |
| 90 | 4 | 8 |
| 91 | 5 | 9 |
| 92 | 6 | 10 |
| 93 | 7 | 11 |
| 94 | 8 | 12 |
| 95 | 9 | 13 |
| 96 | 10 | 14 |
| 97 | 11 | 15 |
| 98 | 12 | 16 |
| 99 | 13 | 17 |
| 100 | 14 | 18 |
| 101 | 15 | 19 |
| 102 | 16 | 20 |
| 103 | 17 | 21 |
| 104 | 18 | 22 |
| 105 | 19 | 23 |
| 106 | 20 | 24 |
| 107 | 21 | 25 |
| 108 | 22 | 26 |
| 109 | 23 | 27 |
| 110 | 24 | 28 |
| 111 | 25 | 29 |
| 112 | 26 | 30 |
| 113 | 0 | 5 |
| 114 | 1 | 6 |
| 115 | 2 | 7 |
| 116 | 3 | 8 |
| 117 | 4 | 9 |
| 118 | 5 | 10 |
| 119 | 6 | 11 |
| 120 | 7 | 12 |
| 121 | 8 | 13 |
| 122 | 9 | 14 |
| 123 | 10 | 15 |
| 124 | 11 | 16 |
| 125 | 12 | 17 |
| 126 | 13 | 18 |
| 127 | 14 | 19 |
| 128 | 15 | 20 |
| 129 | 16 | 21 |
| 130 | 17 | 22 |
| 131 | 18 | 23 |
| 132 | 19 | 24 |
| 133 | 20 | 25 |
| 134 | 21 | 26 |
| 135 | 22 | 27 |
| 136 | 23 | 28 |
| 137 | 24 | 29 |
| 138 | 25 | 30 |
| 139 | 0 | 6 |
| 140 | 1 | 7 |
| 141 | 2 | 8 |
| 142 | 3 | 9 |
| 143 | 4 | 10 |
| 144 | 5 | 11 |
| 145 | 6 | 12 |
| 146 | 7 | 13 |
| 147 | 8 | 14 |
| 148 | 9 | 15 |
| 149 | 10 | 16 |
| 150 | 11 | 17 |
| 151 | 12 | 18 |
| 152 | 13 | 19 |
| 153 | 14 | 20 |
| 154 | 15 | 21 |
| 155 | 16 | 22 |
| 156 | 17 | 23 |
| 157 | 18 | 24 |
| 158 | 19 | 25 |
| 159 | 20 | 26 |
| 160 | 21 | 27 |
| 161 | 22 | 28 |
| 162 | 23 | 29 |
| 163 | 24 | 30 |
| 164 | 0 | 7 |
| 165 | 1 | 8 |
| 166 | 2 | 9 |
| 167 | 3 | 10 |
| — | — | — |
| — | — | — |

In one embodiment, with new sequences for auxiliary SSS, there may be no need to find new sequences for PSS. In other words, the root indices of Table 1 above may be used in the auxiliary PSS as well. Because the auxiliary PSS uses the same sequences as the existing PSS, the same PSS of a given cell is simply repeated more times. With this arrangement, detection of the auxiliary SSS assuming existing SSS sequences would fail. Thus, a legacy UE knows the timing according to the auxiliary {SSS, PSS} pair is incorrect and moves on to search at other time instances.

Figure 8:
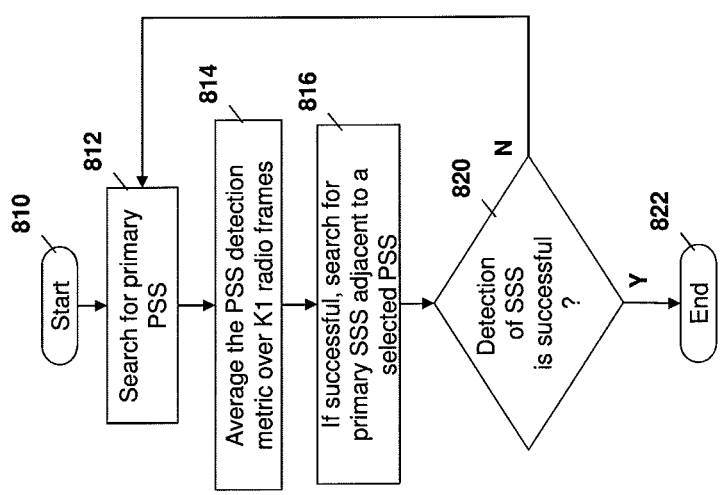
FIG. 8 is a process diagram at a legacy user equipment for detecting SSS according to one embodiment.

Reference is now made to FIG. 8 which shows the UE detection procedure by a legacy UE in accordance with the above. As shown, the UE tries to detect the PSS over multiple frames. When the UE successfully detects the PSS, SSS detection is initialized adjacent to the selected PSS location. If the SSS is not found, the SSS detection procedure is repeated in the next instance of the PSS.

Thus, the process of FIG. 8 starts at block 810 and proceeds to block 812 in which a search for the PSS is performed.

The process then proceeds to block 814 in which an average of the PSS detection metric over K1 radio frames is found.

The process then proceeds to block 816 in which the primary SSS is searched for if the average PSS detection is successful. The search at block 816 is performed in an adjacent location to the selected PSS.

The process then proceeds to block 820 in which a check is made to determine whether the detection of the SSS is successful. If no, the process proceeds back to block 812 to continue to search for the primary PSS. Otherwise, if the search or detection of the SSS is successful, the process proceeds from block 820 to block 822 and ends.

Figure 9:
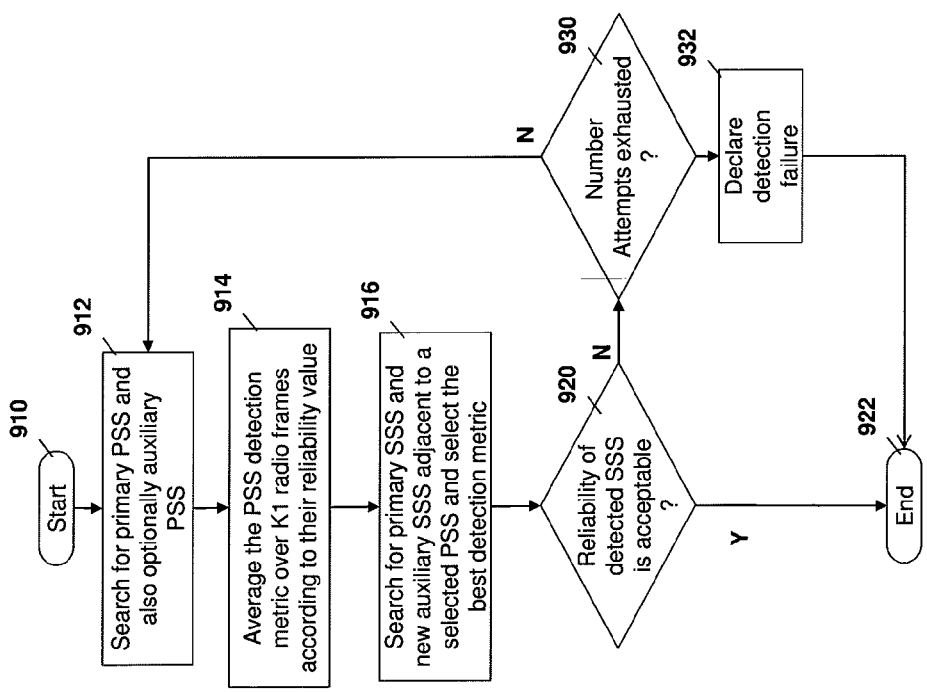
FIG. 9 is a process diagram showing a process at an exemplary user equipment for detecting SSS according to one embodiment.

Reference is now made to FIG. 9 which shows the detection mechanism by a UE implementing the embodiments of the present disclosure. The UE of FIG. 9 tries to detect both the primary SSS and the auxiliary SSS in an attempt to acquire the radio frame timing. To improve detection performance, the primary and auxiliary SSS detection metrics may be combined. However, this may increase the detection delay for legacy UEs since the legacy UEs may perform more SSS detections than before. One way to reduce the possibility of increased detection delay is to the put the auxiliary PSS/SSS positions after the legacy PSS/SSS positions so that the legacy UEs could have a high possibility of detecting default PSS/SSS first. Thus, only when the UE starts searching after the legacy PSS/SSS symbols will the UE detect the auxiliary PSS. For UEs implementing the embodiments of the present disclosure, it may be difficult to detect legacy PSS/SSS so there may not be delay concerns.

Referring to FIG. 9, the process starts at block 910 and proceeds to block 912 in which a search for primary PSS and also for auxiliary PSS is performed.

The process then proceeds to block 914 in which the average of the PSS detection metric over the K1 radio frames is found according to a reliability value.

The process then proceeds to block 916 in which a search for primary SSS and auxiliary SSS is performed. Adjacent to a detected instant of PSS, a search is continued for both the primary and the auxiliary SSS. The best detection metrics from the search are selected.

The process then proceeds to block 920 to check whether the reliability of the detected SSS is acceptable. If yes, the process proceeds to block 922 and ends. Conversely, if the reliability of the detected SSS is not acceptable the process proceeds to block 930 in which a check is made to determine whether a number of attempts is exhausted. As will be appreciated, the number of attempts may be predetermined at the device. If the number of attempts is exhausted the process proceeds to block 932 in which detection failure is declared and the process then proceeds to block 922 and ends.

Conversely, if at block 930 the number of attempts is not exhausted, the process proceeds back to block 912 and continues to loop until either the SSS is detected acceptably or there is a detection failure at block 932.

Placement of Auxiliary PSS/SSS

Since the differentiation between auxiliary synchronization and existing synchronization signals, whether PSS, SSS or both, is achieved through the definition of the sequences, auxiliary synchronization signals can keep the same relative position as existing synchronization signals. Specifically, default PSS and SSS positions in FDD, as shown with regards to FIG. 5, have the SSS in the location preceding the PSS. In TDD, the default PSS is three symbols ahead of the default SSS, as shown in FIG. 6.

Figure 10:
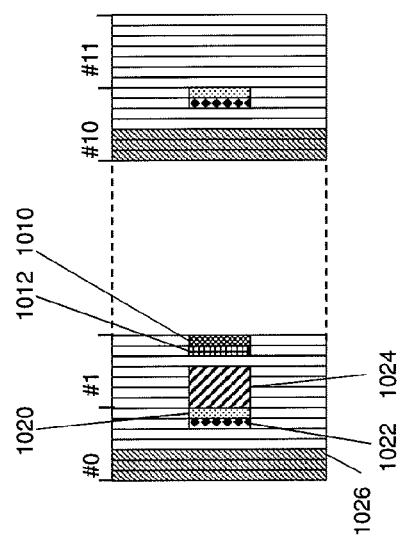
FIG. 10 is a block diagram of a portion of a radio frame in FDD showing the addition of an auxiliary PSS and SSS according to one embodiment.

Reference is now made to FIG. 10, which shows auxiliary synchronization signals located in OFDM symbols number 5 and 6 of slot number 1.

In particular, in FIG. 10 auxiliary PSS 1010 is shown as symbol 6 is slot number 1 and auxiliary SSS 1012 is shown as OFDM symbol number 5 of slot number 1.

Otherwise, referring to FIG. 10, primary PSS 1020, primary SSS 1022, PBCH 1024 and PDCCH 1026 remain the same.

Further, in the embodiment of FIG. 10, the cell specific reference signal (CRS), while not shown, are provided in symbols 0, 1, and 4 each slot.

Figure 11:
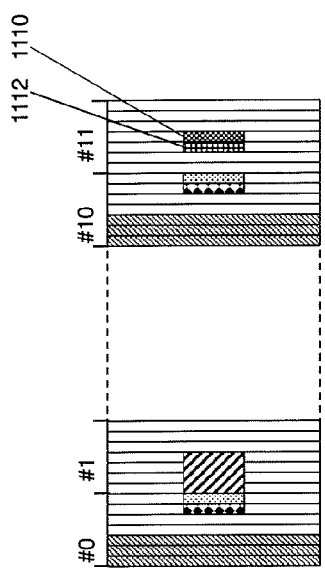
FIG. 11 is a block diagram of a portion of a radio frame in FDD showing the addition of an auxiliary PSS and SSS in a different location from that of FIG. 10 according to another embodiment.
Figure 12:
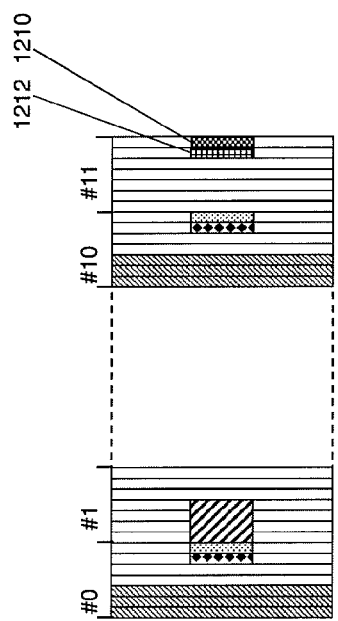
FIG. 12 is a block diagram of a portion of a radio frame in FDD showing the addition of an auxiliary PSS and SSS in a different location from those of FIGS. 10 and 11 according to yet another embodiment.
Figure 13:
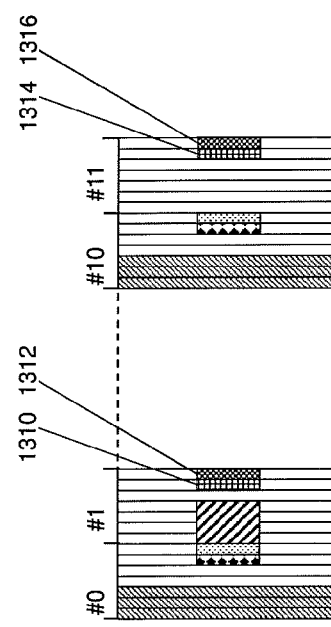
FIG. 13 is a block diagram of a portion of a radio frame in FDD showing the addition of multiple auxiliary PSS and SSS according to one embodiment.

The primary PSS 1020, primary SSS 1022, PBCH 1024 and PDCCH 1026 and CRS are the same for FIGS. 11 to 13.

Reference is now made to FIG. 11. In the embodiment of FIG. 11, the auxiliary PSS and SSS are located in OFDM symbols number 2 and 3 in slot number 11 as shown by reference numerals 1110 for the auxiliary PSS and 1112 for the auxiliary SSS.

Reference is now made to FIG. 12. In the example of FIG. 12, the auxiliary PSS and SSS are located in OFDM symbols numbers 5 and 6 in slot number 11, as shown by reference numeral 1210 for the auxiliary PSS and 1212 for the auxiliary SSS.

With regard to FIGS. 10-12, while not shown in the figures, the Channel State Information-Reference Signals (CSI-RS) can occupy the same OFDM symbol as the auxiliary synchronization signals. Since the period of the auxiliary synchronization signal is a multiple of five sub-frames, the overlap may be avoided by configuring the CSI-RS to occupy different sub frames than the auxiliary synchronization signal.

The auxiliary PSS/SSS may occupy resource elements that normally contain the PDSCH and the PDSCH transmission or reception may be adjusted based on this. This may be achieved by either replacing REs containing PDSCH with auxiliary PSS/SSS or by increasing the code rate of the PDSCH data such that it fits in the sub-frame without occupying REs containing auxiliary PSS/SSS. Thus, in the first example this may be referred to puncturing REs in the PDSCH and in the second it may be termed rate matching the PDSCH around colliding REs.

UEs implementing the embodiments of the present disclosure can use the rate matching approach since they can adjust the rate matching to use only valid REs containing PDSCH. Conversely, legacy UEs may use the punctured approach since the legacy UEs may not be aware of the auxiliary PSS/SSS. An eNB transmitting to a legacy UE may use a conservative modulation and coding scheme (MCS) to achieve an acceptable error rate for such puncturing.

Further, as described above, the auxiliary PSS and SSS can keep their relative position, where the auxiliary SSS is right before the auxiliary PSS. Further, the examples of FIGS. 10-12 show that the synchronization signals are located in the same sub-frame as existing synchronization signals. While only one set of auxiliary PSS/SSS is added in one radio frame in the embodiment of FIGS. 10-12 in order to reduce the overhead, more auxiliary PSS or SSS instances may be defined if high detection reliability is desired. For example, two new sets of auxiliary PSS/SSS can be defined per radio frame.

Reference is now made to FIG. 13, where new sequences for auxiliary PSS and/or SSS provide differentiation from existing PSS/SSS. In the example of FIG. 13, the auxiliary synchronization signals may be located in OFDM symbols number 5 and 6 of slot number 1 and slot number 11. Thus, in FIG. 13 the auxiliary PSS is shown by reference numerals 1312 and 1316, while the auxiliary SSS is shown by reference numerals 1310 and 1314.

The examples of FIGS. 10 to 13 are merely meant as possibilities showing placement of the auxiliary PSS and SSS, and are not limiting. Other examples such as different OFDM symbols in different slots are possible.

Figure 14:
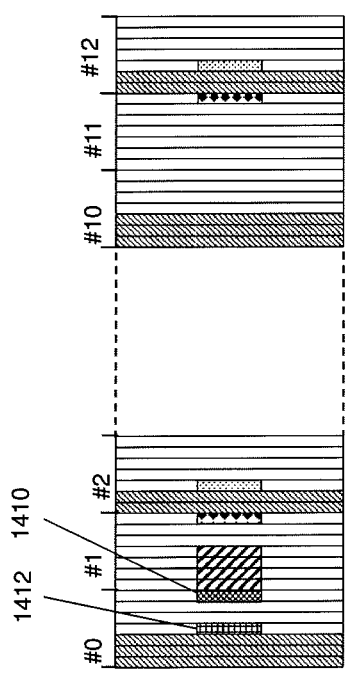
FIG. 14 is a block diagram of a portion of a radio frame in TDD showing the addition of an auxiliary PSS and SSS according to one embodiment.

Further, similar arrangements may exist for TDD. This is illustrated with regard to FIGS. 14 to 17. In FIG. 14, the auxiliary synchronization signals are located in OFDM symbols number 3 and 6 of slot number 0. IN particular, the auxiliary PSS 1410 is located is symbol number 6 of slot 0 and the auxiliary SSS 1412 is located in symbol 4 of slot 0.

Figure 15:
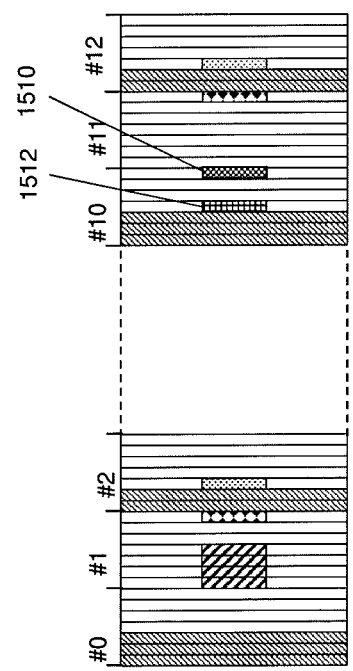
FIG. 15 is a block diagram of a portion of a radio frame in TDD showing the addition of an auxiliary PSS and SSS in a different location from that of FIG. 14 according to another embodiment.

Similarly, in FIG. 15, the auxiliary synchronization signals are located in OFDM symbols number 3 and 6 of slot 10. Thus, in FIG. 15, the auxiliary PSS 1510 is located in symbol number 6 of slot number 10 and the auxiliary SSS 1512 is located in symbol number 4 of slot number 10.

Referring to FIG. 16, the auxiliary synchronization signals are located in OFDM symbol number 6 of slow number 10 and OFDM symbol number 2 of slot number 11. This is shown with reference numeral 1610 for the auxiliary PSS and reference number 1612 for the auxiliary SSS.

Referring to FIG. 17, the auxiliary synchronization signals are located in OFDM symbols number 2 and 5 of slot number 11, as shown by reference numeral 1710 for the auxiliary PSS and reference numeral 1712 for the auxiliary SSS.

Again, the auxiliary PSS and SSS can keep their relative position where the auxiliary SSS is three OFDM symbols before the PSS. Maintaining the relative position of the auxiliary PSS and SSS allows the UE to differentiate between FDD and TDD during initial cell search as in the case of existing designs.

New Relative Position Between Auxiliary PSS and SSS

In a further embodiment, one way to avoid confusion between auxiliary PSS and SSS and existing PSS and SSS is to place the location of the auxiliary SSS relative to the auxiliary PSS different from the relative location of existing PSS and SSS signaling. For FDD, this means that the auxiliary SSS is not located right before the auxiliary PSS. For TDD, this means that the auxiliary SSS is not located three OFDM symbols ahead of the auxiliary PSS. In this way, new sequences may not need to be introduced for either PSS or SSS.

For legacy UEs, after the detection of the PSS, the legacy UE will fail to detect the SSS. The detection will thus be attempted again. While this may increase the detection delay for legacy UEs, on the UE side, the delay impact may be affected by the UEs implementation. On the network side, one way to reduce the delay is to put the auxiliary PSS/SSS positions just after the legacy PSS/SSS so that the legacy UEs may have a higher probability of detecting the legacy PSS/SSS first. For UEs implementing the embodiments of the present disclosure, since one scenario of concern is a high interference situation, it may be difficult to detect default PSS/SSS so there may be no delay concerns.

Figure 18:
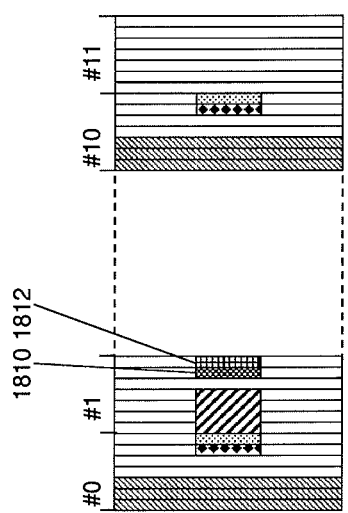
FIG. 18 is a block diagram of a portion of a radio frame in FDD showing the addition of an auxiliary PSS and SSS in which the location of the PSS and SSS have been reversed, according to one embodiment.
Figure 19:
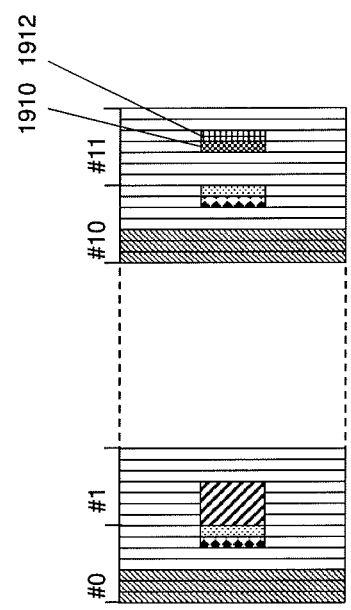
FIG. 19 is a block diagram of a portion of a radio frame in FDD showing the addition of an auxiliary PSS and SSS in which the location of the PSS and SSS have been reversed and the location is different from that of the embodiment of FIG. 18, according to another embodiment.
Figure 20:
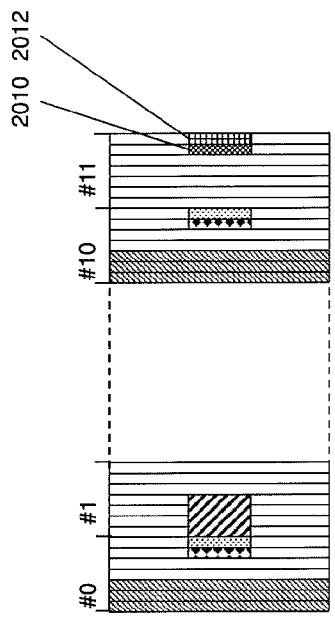
FIG. 20 is a block diagram of a portion of a radio frame in FDD showing the addition of an auxiliary PSS and SSS in which the location of the PSS and SSS have been reversed and the location is different from those of the embodiment of FIGS. 18 and 19, according to yet another embodiment.

Reference is now made to FIGS. 18 to 20. FIGS. 18 to 20 show examples various options for FDD, where the relative positions of SSS and PSS are chosen such that SSS is immediately after PSS. In other words, the relative position is swapped compared with the embodiments of FIGS. 10 to 12.

Thus, in the embodiment of FIG. 18, the auxiliary synchronization signals are located in OFDM symbols number 5 and 6 of slot number 1, with the auxiliary PSS 1810 being just ahead of auxiliary SSS 1812.

In the embodiment of FIG. 19, the auxiliary synchronization signals are located in OFDM symbols number 2 and 3 of slot number 11, with the auxiliary PSS 1910 being just ahead of the auxiliary SSS 1912.

In the embodiment of FIG. 20, the auxiliary synchronization signals are located in OFDM symbols number 5 and 6 in slot number 11, with the auxiliary PSS 2010 located just ahead of auxiliary SSS 2012.

The examples of FIGS. 18 to 20 are not meant to be limiting and it would be straightforward for those skilled in the art having regard to the present disclosure to adopt other relative positions as well, such as the SSS being two OFDM symbols before or after the PSS. Further, in some embodiments it may be possible to puncture the CRS and this would provide further options for locating the auxiliary synchronization signals.

Similarly, for TDD similar position swapping may be applied. For example, the position of the auxiliary SSS and PSS in FIGS. 14 to 17 can be swapped, while reusing the existing sequences for both PSS and SSS.

Auxiliary SSS Sequence Only

In a further embodiment, since the detection reliability of PSS is higher than SSS because there are more hypotheses to be tested in SSS, only the auxiliary SSS may be added to the victim cell in one embodiment. With only auxiliary SSS sequences introduced, overhead is reduced and UE processing is simplified. The UE may detect the PSS using existing PSS sequences.

Figure 21:
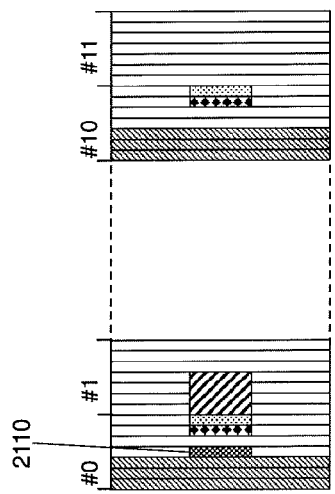
FIG. 21 is a block diagram of a portion of a radio frame in FDD showing the addition of an auxiliary SSS according to one embodiment.

For example, reference is now made to FIG. 21, which shows an exemplary FDD system where only an auxiliary SSS sequence is added rather than both auxiliary SSS and PSS sequences. By adding only the auxiliary SSS sequence, the auxiliary SSS can be located in the same sub-frame with default PSS and SSS sequences such that the UE can quickly detect the auxiliary SSS after PSS is detected.

In one embodiment, the location of the auxiliary SSS should not collide with the PSS/SSS/PBCH of aggressor cells. Thus, if there is no data transmission in the aggressor cells over the resource elements where auxiliary SSS sequences of the victim cells are located, the auxiliary SSS will not be interference limited. Further, non-coherent detection techniques may be applied in a high speed scenario if no reliable PSS can be used.

As shown in FIG. 21, the location of the auxiliary SSS 2110 can be the fourth symbol of sub-frame 0, which is close to the existing PSS/SSS.

Figure 22:
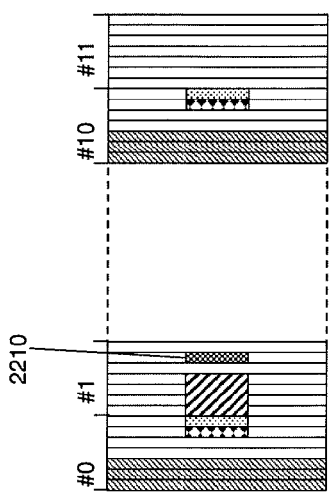
FIG. 22 is a block diagram of a portion of a radio frame in FDD showing the addition of an auxiliary SSS in a different location from that of FIG. 21 according to another embodiment.

The auxiliary SSS 2210 can also be placed in the second last symbol of sub-frame 0, as shown in FIG. 22.

Figure 23:
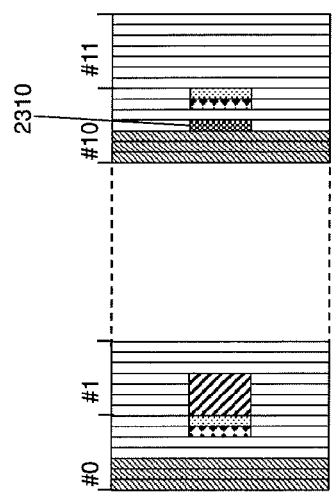
FIG. 23 is a block diagram of a portion of a radio frame in FDD showing the addition of an auxiliary SSS in a different location from those of FIGS. 21 and 22 according to yet another embodiment.

Referring to FIG. 23, the auxiliary SSS 2310 may be placed at the fourth symbol of sub-frame 5, which again is close to the existing PSS/SSS.

Figure 24:
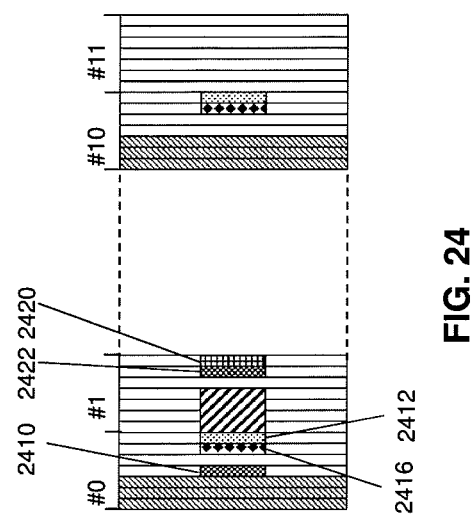
FIG. 24 is a block diagram of a portion of a radio frame in FDD showing the addition of an auxiliary SSS in addition to an auxiliary PSS and SSS pair according to one embodiment.

Alternatively, the auxiliary SSS may be added together with the auxiliary PSS/SSS pair to further improve SSS detection probability. This is shown with regard to FIG. 24. Specifically, the auxiliary SSS 2410 is located in the same sub-frame as the default PSS 2412 and SSS 2416, as well as the auxiliary PSS 2420 and a further auxiliary SSS 2422.

The use of auxiliary SSS 2410 may reduce the UE detection window. The above has slightly less overhead compared to two sets of auxiliary PSS/SSS as shown above with regard to FIG. 13. The existing SSS sequence can be reused for the auxiliary SSS sequences.

Further, if multiple cells with overlapped coverage areas require auxiliary PSS/SSS, a cell may be both an aggregator and a victim. Thus, each cell can choose a different location for the auxiliary PSS/SSS to avoid collision. To avoid collision between auxiliary PSS/SSS/PBCHs from the macro and pico in the presence of a femto cell, the macro and the pico can choose to transmit the auxiliary PSS/SSS/PBCH in different locations, each using a different configuration to that shown in FIG. 24.

Auxiliary PSS/SSS/PBCH in Different Bandwidth

As existing PSS/SSS/PBCHs are transmitted in a central six resource blocks (RBs) of the system, one option is to transmit the auxiliary PSS/SSS/PBCH in other RBs of the system. For example, the auxiliary PSS/SSS/PBCH can be transmitted in the contiguous six RBs adjacent to the central six RBs. Alternatively, the auxiliary PSS/SSS/PBCH can be transmitted adjacent to both sides of the existing PSS/SSS/PBCH. In other words, the three RBs may be extended to each side of the existing PSS/SSS/PBCH.

By using different bandwidth, impact to legacy UEs synchronization and cell detection is minimized as there is no auxiliary PSS/SSS/PBCH to confuse a legacy UE's synchronization and cell detection. However, those RBs where the auxiliary PSS/SSS/PBCH are transmitted will not be available for legacy UE data transmission, which may reduce scheduling flexibility for legacy UEs. However, the eNBs could still schedule these RBs for the UEs implementing the methods of the present disclosure. On the other hand, if the system bandwidth is small, such as 1.25 MHz, there may not be additional frequency resources available for the auxiliary PSS/SSS sequence. For system bandwidth larger than a threshold, such as 1.25 MHz, the auxiliary PSS/SSS sequences can be placed in the RBs next to the central six RBs where the existing PSS/SSS are transmitted. The existing PSS/SSS sequence can be reused for the auxiliary PSS/SSS sequences.

The frequency location of the auxiliary PSS/SSS/PBCH is preconfigured and known to UEs implementing the embodiments of the present disclosure. In addition, searching the PSS/SSS/PBCH sequences in the central six RBs, the UEs implementing the present embodiments may also search other preconfigured RBs for auxiliary PSS/SSS. If any auxiliary PSS/SSS is detected, the UE may add the cell to its measurement list for cell selection/reselection or handover.

To limit interference, an aggressor may not transmit any data on the REs where the auxiliary PSS/SSS sequences are transmitted in one embodiment.

Half-Size Auxiliary PSS/SSS

In release 8 to release 10 LTE specifications, the combination of two length-31 sequences defining the secondary synchronization signals differs between sub-frame 0 and sub-frame 5 in accordance with:

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad (3)$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

Where $0 \leq n \leq 30$. The indices $m_0$ and $m_1$ are derived from the physical-layer cell-identity group $N_{ID}^{(1)}$ to:

$$m_0 = m' \bmod 31 \quad (4)$$
$$m_1 = (m_0 + \lfloor m'/31 \rfloor + 1) \bmod 31$$
$$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

Figure 25:
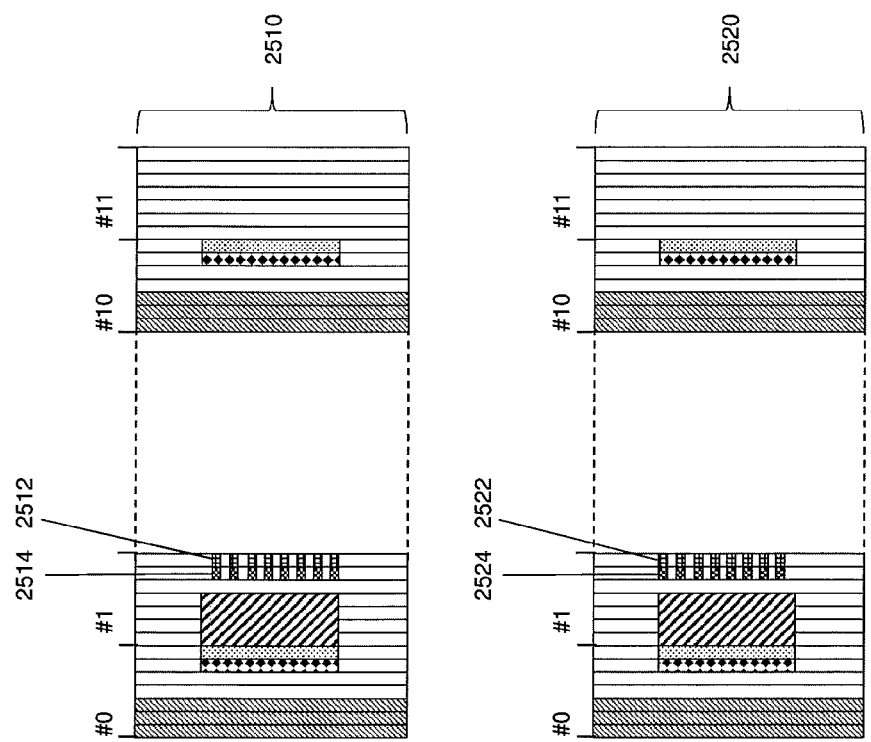
FIG. 25 is a block diagram of two radio frames in FDD showing the addition of a half-length auxiliary PSS and SSS, wherein the two radio frames may be frequency multiplexed according to one embodiment.

To keep the overhead of the auxiliary PSS/SSS low, in one embodiment a half-sized PSS/SSS may be introduced. Reference is now made to FIG. 25 which shows a first cell 2510 and a second cell 2520. In cell 2510, the auxiliary PSS 2512 may be frequency multiplexed with the auxiliary PSS 2522 from the second cell 2520. Similarly, the auxiliary SSS 2514 in cell 2510 is placed such that it is opposite to the secondary SSS 2524 of cell 2520.

Figure 26:
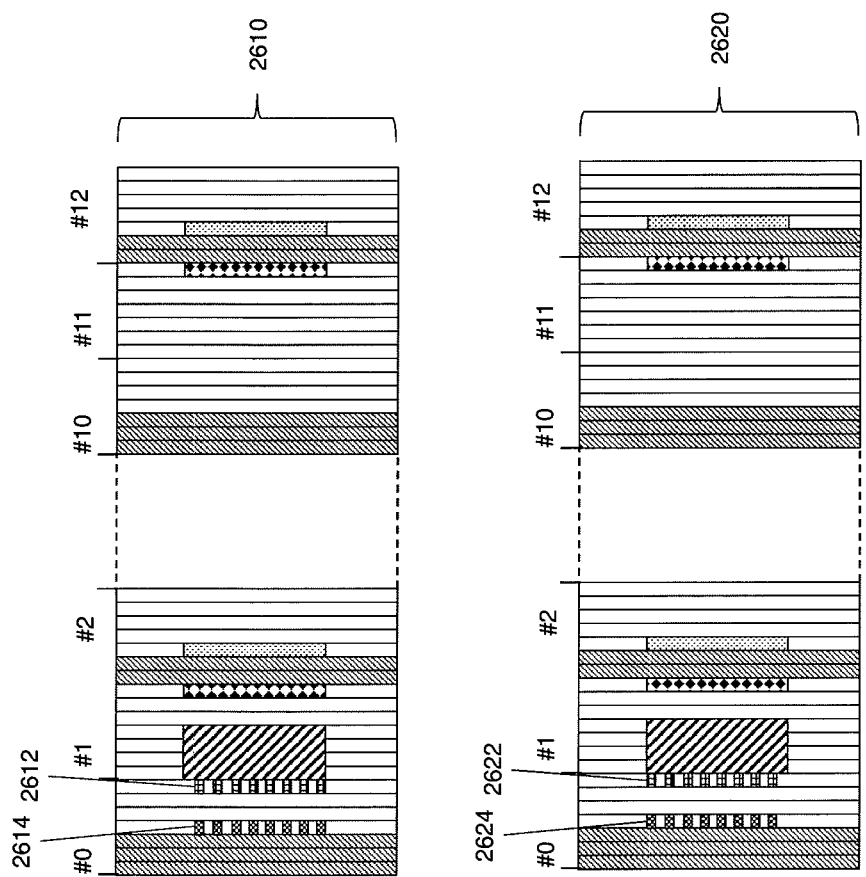
FIG. 26 is a block diagram of two radio frames in TDD showing the addition of a half-length auxiliary PSS and SSS, wherein the two radio frames may be frequency multiplexed according to one embodiment.

FIG. 26 shows the same thing for TDD. In particular, a first cell 2610 and a second cell 2620 utilize a half-sized PSS and SSS. Specifically, the auxiliary PSS 2612 of cell 2610 can be frequency multiplexed with auxiliary PSS 2622 of second cell 2620. Similarly, auxiliary SSS 2614 is can be frequency multiplexed with auxiliary SSS 2624 of the second cell 2620.

Equations for various alternatives for the SSS are shown below. In particular, in a first alternative for the auxiliary sequence of the SSS the cells may be represented as:

$$\text{Cell A: } \begin{cases} d(2n) = \text{Null} \\ d(2n+1) = s_1^{(m_1)}(n)c_1(n)z_1^{(m_0)}(n) \end{cases} \quad (5)$$

$$\text{Cell B: } \begin{cases} d(2n) = s_1^{(m_1)}(n)c_1(n)z_1^{(m_0)}(n) \\ d(2n+1) = \text{Null} \end{cases}$$

For a second alternative for the auxiliary sequence of SSS, the cells may be represented by:

$$\text{Cell A: } \begin{cases} d(2n) = s_0^{(m_0)}(n)c_1(n)z_1^{(m_1)}(n) \\ d(2n+1) = \text{Null} \end{cases} \quad (6)$$

$$\text{Cell B: } \begin{cases} d(2n) = \text{Null} \\ d(2n+1) = s_0^{(m_0)}(n)c_1(n)z_1^{(m_1)}(n) \end{cases}$$

In the above, null indicates that the auxiliary SSS is not transmitted in the corresponding resource element (RE) that would be occupied by the SSS if transmitted in an OFDM symbol, and the RE is instead left unoccupied or occupied by other signals such as PDSCH or reference signals.

The half-sized auxiliary PSS/SSS allows frequency resource sharing between two neighboring cells, thus reducing the overhead from the auxiliary PSS/SSS. While the consequence of the half-sized PSS/SSS is that the auto-correlation peak is reduced by half in a UE detector, the degradation may not be high in the cell search performance since the aggressor cell may be blank in the corresponding REs. Without inter-cell interferences, the PSS and SSS can perform with reduced length. This is because existing full size PSS/SSS are designed to function without protection and thus with inter-cell interference from neighboring cells.

In a further embodiment, overhead may be reduced by transmitting auxiliary PSS/SSS less frequently. This results a time domain overhead reduction and can be accomplished by, for example, transmitting every other radio frame. The alternative may increase the detection delay by 10 milliseconds but sequences do not need to be defined with a new length.

Further, in release 8, the PSS is symmetric in the time domain while the SSS is not. With the time domain symmetric property, the UE identifies the PSS location by comparing the signals in the first half and second half of the OFDM symbol duration. In the case of a half-sized auxiliary PSS, both auxiliary PSS and SSS have this symmetric property in the time domain. To facilitate the UE identification of the PSS location, UEs implementing the embodiments of the present disclosure may need to buffer the signals of the duration of two OFDM symbols. If the signal length shows the symmetric property in both OFDM durations, then the second OFDM symbol is the PSS location.

While in the examples of FIGS. 25 and 26, in FDD two OFDM symbols are adjacent and in TDD the two OFDM symbols are three OFDM symbols apart, this is merely meant as an example and the half PSS and SSS length can be applied to the other embodiments described above.

Auxiliary PBCH

Without sub-frame offset, the PBCH from the victim cell may be interfered with by the PBCH from the aggressor cell. To allow a victim cell to receive the MIB from a serving cell, the victim cell may transmit additional PBCH in a new location. To protect the auxiliary PBCH of the victim cell, the aggressor cell may, in one embodiment, not transmit or transmit a low power RB in the auxiliary PBCH location.

Thus, in accordance with the present disclosure, a UE implementing the embodiments herein decodes the additional PBCH. The auxiliary PBCH may not impact a legacy UE.

Figure 27:
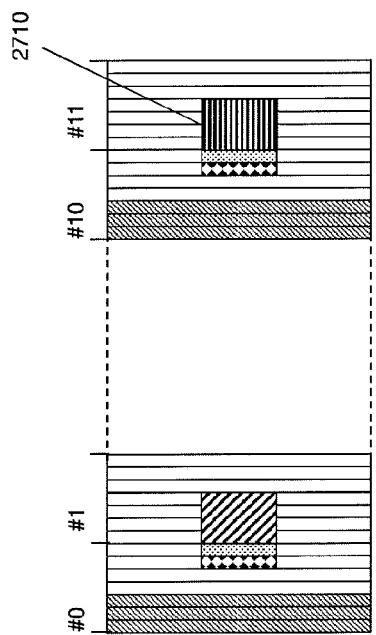
FIG. 27 is a block diagram of a portion of a radio frame in FDD showing the addition of an auxiliary PBCH according to one embodiment.
Figure 28:
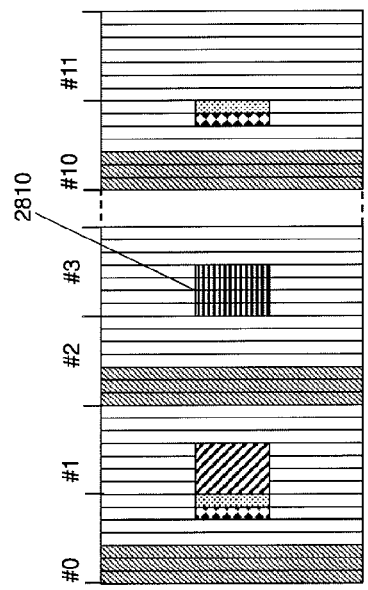
FIG. 28 is a block diagram of a portion of a radio frame in FDD showing the addition of an auxiliary PBCH in a different location from that of FIG. 27 according to another embodiment.
Figure 29:
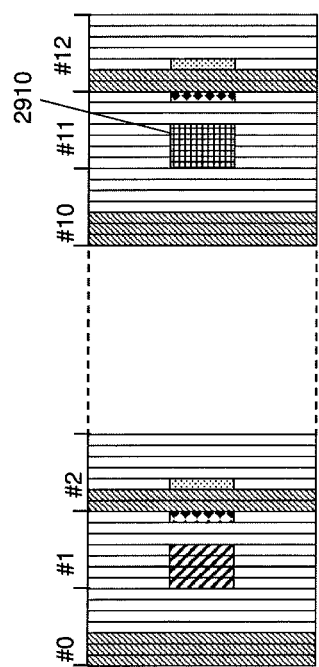
FIG. 29 is a block diagram of a portion of a radio frame in FDD showing the addition of an auxiliary PBCH in a different location from those of FIGS. 27 and 28 according to yet another embodiment.

Reference is now made to FIGS. 27, 28 and 29, which shows examples of an auxiliary PBCH for the FDD and TDD.

Similar to a default PBCH, the auxiliary PBCH should, in one embodiment, not occupy the resource elements reserved for the CRS antenna ports 0 to 3. The auxiliary PBCH could be located in any downlink sub-frames, but in general may occupy the same central six RBs as those of the default PBCH. Within a radio frame, the auxiliary PBCH and the default PBCH transmit the same MIB information on a given cell in one embodiment.

One auxiliary PBCH is a simple repetition of existing PBCH signal on the radio frame. However, other formats are possible. For example, a different modulation or coding process may be used to transmit the auxiliary PBCH in a more compact form. If the auxiliary PBCH is close to an auxiliary PSS or SSS, the auxiliary PSS/SSS could also provide channel estimates to facilitate the decoding of the auxiliary PBCH.

Referring to FIG. 27, the figure shows the auxiliary PBCH for FDD. In particular, in the embodiment of FIG. 27 the auxiliary PBCH is located in symbols 0-3 of the slot number 11, as shown by reference numeral 2710.

Referring to FIG. 28, the auxiliary PBCH is shown in symbols 0-3 of slot number 3, as shown by reference numeral 2810.

With regard to the time domain duplex, reference is made to FIG. 29, which shows the auxiliary PBCH in symbols 0-3 of slot number 11, as shown by reference numeral 2910.

The auxiliary PBCH occupies REs that generally contain PDSCH, and so PDSCH transmission or reception may need to be adjusted. Thus can be achieved by either replacing REs containing PDSCH with auxiliary PBCH (puncturing the REs in the PDSCH), or by increasing the code rate of the PDSCH data such that it fits in the new sub-frame without occupying the REs containing auxiliary PBCH (rate matching the PDSCH around the colliding REs).

UEs implementing the embodiments of the present disclosure can use the rate matching approach, since they can adjust the rate matching to use only valid REs containing PDSCH. Legacy UEs may need to use the puncturing approach since they may not be aware of the auxiliary PBCH. An eNB may use a conservative MCS to achieve acceptable reception error rate if puncturing is used. To avoid an impact on legacy UEs, the eNB may schedule only UEs implementing the embodiments of the present disclosure on RBs containing the auxiliary PBCH in one embodiment.

Blanking to Protect the Auxiliary PSS/SSS/PBCH

To ensure proper detection of the auxiliary PSS/SSS under inter-cell interference scenarios, in one embodiment REs used for the PSS/SSS/PBCH transmission in the victim cell should not be used for data transmission by neighboring cells having strong interference.

In one example, the sub-frames where the auxiliary PSS/SSS/PBCH reside are designated as almost blank subframes (ABS) in the aggressor cells. The sub-frames for the auxiliary PSS/SSS/PBCH should be reconfigured or updated in the victim cell, depending on the ABS configurations or reconfigurations of the neighboring aggressor cells.

In another example, the sub-frames where the auxiliary PSS/SSS/PBCH reside are not ABS, but the eNB of the aggressor cell does not allocate any PDSCH or allocates a PDSCH with a low transmit power to the central 6 RBs. This provides the benefit of removing inference to the auxiliary PSS/SSS/PBCH, without forfeiting RBs not colliding with the auxiliary PSS/SSS/PBCH In yet a further embodiment, the eNB of the aggressor cell may be aware of RE locations of the auxiliary PSS/SSS/PBCH and may not transmit any data over those REs while transmitting data in other non-colliding REs. This may be achieved by either replacing REs containing PDSCH with auxiliary PSS/SSS/PBCH (puncturing the REs in the PDSCH), or by increasing the code rate of the PDSCH data such that the data fits in the sub-frame without occupying the REs containing the auxiliary PSS/SSS/PBCH (rate matching the PDSCH around the colliding REs).

On the UE side, for a UE implementing the embodiments of the present disclosure, the UE may demodulate or decode the data by only receiving the valid REs containing the PDSCH in the allocated RBs. For legacy UEs, all the REs may be received in the allocated RBs, in order to demodulate or decode the data. In this case, only puncturing the REs is applicable. The eNB may use a conservative MCS to protect data so the reception may still be successful or HARQ retransmissions may be applied.

To enable proper blanking of the aggressor cells and configuration of the auxiliary PSS/SSS/PBCH, both in location and size, coordination information can be sent from the victim cell to the aggressor cell via signaling, such as X2 signaling. In another embodiment, the aggressor cell could request such information from the victim cell.

Avoid Collision of Auxiliary PSS/SSS/PBCH Among Multiple Cells

If multiple cells with overlapping coverage areas require auxiliary PSS/SSS/PBCH, each cell can choose a different location for the auxiliary PSS/SSS/PBCH to avoid collisions. For example, in the case of a macro, pico and femto deployment, where the pico and the femto cells are in the macro cell's coverage area and the coverage areas of the pico and the femto cells do not overlap, the macro needs to transmit the auxiliary PSS/SSS/PBCH to facilitate the macro UE close to the CSG cell and the pico needs to transmit the auxiliary PSS/SSS/PBCH as well to facilitate the UE in the range expansion area.

Figure 30:
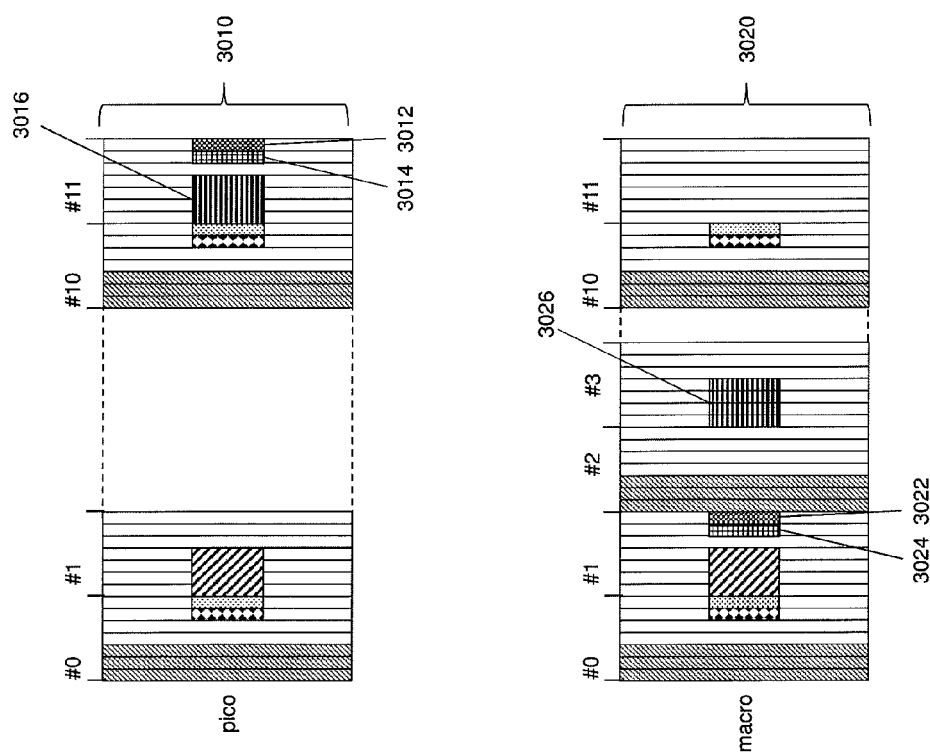
FIG. 30 is a block diagram showing two radio frames in which the auxiliary cell selection signals are located in different positions between the two radio cells according to one embodiment.

To avoid collisions between the auxiliary PSS/SS/PBCHs from the macro and the pico, the macro and the pico can choose to transmit the auxiliary PSS/SSS/PBCH on different locations. For example, reference is now made to FIG. 30, which shows the radio frame 3010 for the pico and radio frame 3020 for the macro cell. In radio frame 3010, pico cell the auxiliary PSS 3012 in the sixth symbol of slot number 11 and the auxiliary SSS 3014 in the fifth symbol of slot number 11.

Further, the pico sends the auxiliary PBCH 3016 in symbol 0 to 3 of slot number 11.

On the macro cell, the macro cell sends the auxiliary PSS 3022 on the sixth symbol of slot number 1, the auxiliary SSS 3024 on the fifth symbol of slot number 1 and sends the auxiliary PBCH on symbols 0-3 of slot number 3, as shown by reference numeral 3026.

To help the UE determine the radio frame boundary and the auxiliary PBCH location, different sequences can be used for the auxiliary SSS at different locations. For example, the auxiliary SSS in sub-frame 0 and 5 will use different sequences. Further, in one embodiment, a new sequence as described above may be used for the auxiliary PSS. The auxiliary SSS in sub-frame number 0 will reuse legacy SSS sequence of sub frame number 0 and the auxiliary SSS in sub-frame number 5 will reuse the legacy SSS of the sequence of sub-frame number 5. In this case, when a UE detects the combination of the auxiliary PSS sequence and the legacy sub-frame number 0 SSS sequence, the UE may know it is currently at the last two OFDM symbols of sub-frame number 0 and the auxiliary PBCH is in the next sub-frame. If the UE detects the combination of the auxiliary PSS sequence the legacy sub-frame number 5 SSS sequence, the UE would know it is currently at the last two OFDM symbols of sub-frame number 5 and the auxiliary PBCH is right before.

Alternatively, macro and pico cells may each have their own physical cell identifier (PCI) space which is sent on the PSS/SSS. For example, the macro cell may send the auxiliary PSS/SSS in sub-frame number 0 and the auxiliary PBCH in sub-frame number 1 and the pico may send the auxiliary PSS/SSS/PBCH in sub-frame number 5. According to this embodiment, the macro and the pico would use the same sequence for the auxiliary SSS. After the UE detects the PCI from the auxiliary PSS/SSS the UE would know whether it is from a macro or pico and hence determine the radio frame boundary and auxiliary PBCH location accordingly.

Enabling the Detection of Auxiliary PSS/SSS

In one embodiment, the UE may need to receive the PSS/SSS to search a cell when it wants to camp on the cell. In addition, the UE may need to receive the PSS/SSS for frequency or time acquisition, which is required for the serving cell as well as the neighboring cell measurements.

Thus, if a UE utilizing the embodiments of the present disclosure is capable of detecting auxiliary PSS/SSS, the UE may be able to perform the detection of the auxiliary PSS/SSS for the initial cell search and neighboring cell measurement. However, since the auxiliary PSS/SSS is not transmitted in all cells, it would increase the UE battery power consumption if the UE performs detection of both current PSS/SSS and auxiliary PSS/SSS all the time.

In order to overcome the above and increase the likelihood of using auxiliary PSS and SSS and decrease the UE power consumption, various options are possible.

In a first embodiment, the UE may always turn on the detection of auxiliary PSS/SSS for all cells for initial cells search and neighboring cell measurements if the UE is capable of receiving the auxiliary PSS/SSS.

In a second embodiment, an explicit indication may be signaled to the UE to indicate whether the UE needs to detect the auxiliary PSS/SSS. The explicit indication may be signaled using higher layer signaling. This may imply that the UE needs to be in a connected state to receive such signaling. Since the UE cannot receive higher layer signaling from the eNB before the UE finds the cell, this option is not applicable for the initial cell search in the cell selection. However, the explicit signaling can be included in the system information to let the UE detect the neighbor cells for the purpose of cell reselection. In addition, dedicated signaling may be applicable for neighbor cell measurements when the UE is in a connected state. The eNB may transmit a dedicated radio resource control (RRC) signaling to the UE to indicate the presence of auxiliary PSS/SSS, after which the UE can perform cell search with the auxiliary PSS/SSS. This may be included in the measurement configuration message, which is a type of radio resource control (RRC) signal.

Although not strictly necessary, the frequency resource and timing for PSS/SSS could be configurable if the auxiliary PSS/SSS is always used for UEs enabled by RRC signaling. In addition, if the eNB signals the cell identifier of neighboring cells with the enabling detection of the auxiliary PSS/SSS, it may not be necessary to identify the cell ID with the PSS/SSS. In this case, either PSS or SSS or any new sequence could be used for frequency and time acquisition purposes. If multiple cells need the auxiliary PSS/SSS, the UE may need to receive both the PSS and the SSS to identify which cell the PSS and SSS are transmitted for, although the cell ID is given. Alternatively, if the new sequence is used and a mapping between the cell ID and the new sequence is defined, different sequences can be assigned for each cell in the neighboring cell list and the UE can detect the cell ID with the sequence.

In a third option, an implicit indication may be used. The UE may enable the detection of auxiliary PSS/SSS when the measurement in the restricted sub-frames is configured. More specifically, the UE may enable the detection of auxiliary PSS/SSS when the measSubframePatternConfigNeigh is received at the UE from the eNB and is included in the MeasObjectEUTRA which is transmitted to configure the measurement. In a release 10 LTE, ABS is used to avoid interference in heterogeneous network deployment scenarios. Therefore, of the measurement of restricted sub-frames may occur because both features are helpful to avoid interference in heterogeneous network scenarios. Given that the measurement in the restricted sub-frames is configured when the UE is connected, this option may only be applicable for UEs in accordance with the present embodiments performing neighbor cell measurements.

The above may be implemented by any network element. A simplified network element is shown with regard to FIG. 31.

Figure 31:
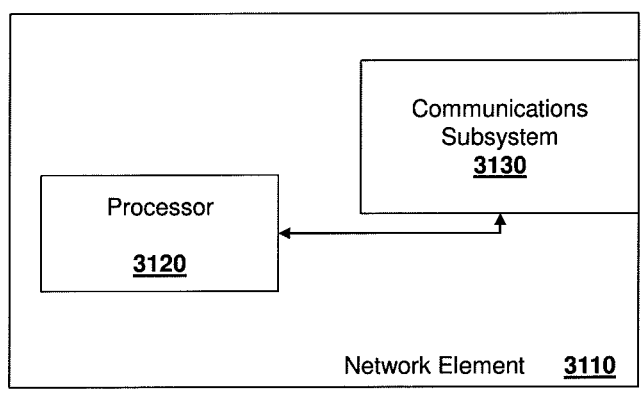
FIG. 31 is a simplified block diagram of an exemplary network element according to one embodiment.

In FIG. 31, network element 3110 includes a processor 3120 and a communications subsystem 3130, where the processor 3120 and communications subsystem 3130 cooperate to perform the methods described above.

Further, the above may be implemented by any UE. One exemplary device is described below with regard to FIG. 32.

UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 32:
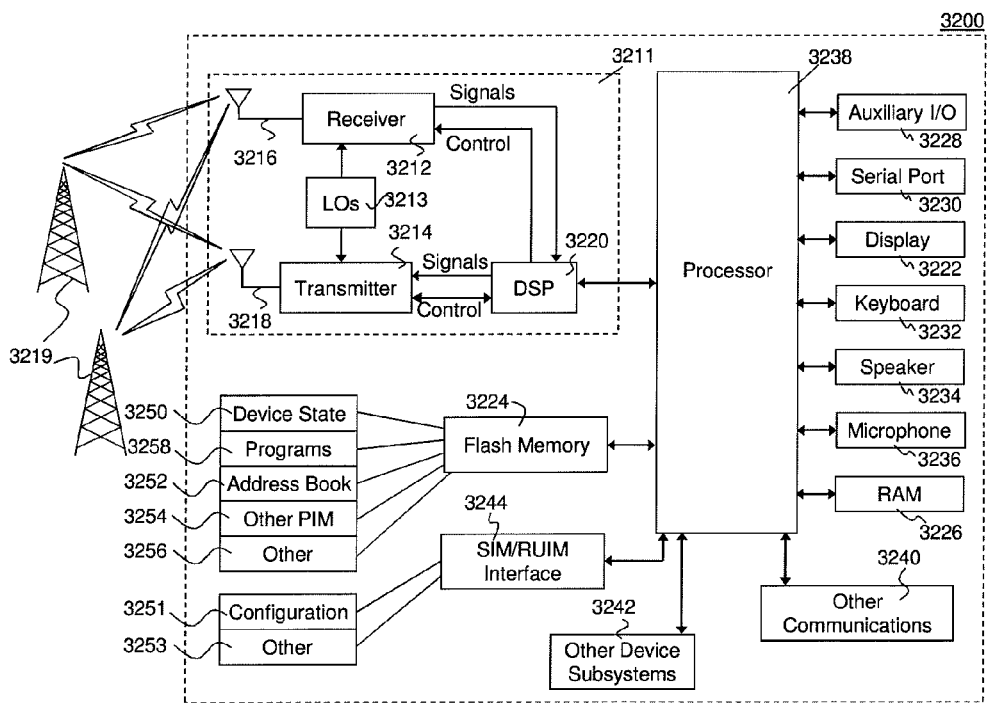
FIG. 32 is a block diagram with an example user equipment capable of being used with the systems and methods in the embodiments described herein.

When required network registration or activation procedures have been completed, UE 3200 may send and receive communication signals over the network 3219. As illustrated in FIG. 32, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control.

For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 32 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 32 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a network element operating in a wireless network, the method comprising:
    transmitting, by the network element, a default cell search signal, the default cell search signal comprising a default Synchronization Signal including a default Primary Synchronization Signal ('PSS') transmitted at symbol n1 of a first time slot and a default Secondary Synchronization Signal ('SSS') transmitted at a symbol n2 of the time slot, wherein (n2−n1) is equal to k;
    transmitting, by the network element, an auxiliary cell search signal, the auxiliary cell search signal comprising an auxiliary Synchronization Signal including an auxiliary PSS transmitted at symbol n3 in a second time slot and an auxiliary SSS transmitted at symbol n4 in the second time slot, wherein (n3−n4) is equal to k;
    receiving, at the network element, communication signals from a user equipment in response to the default cell search signal and the auxiliary cell search signal wherein the network element further signals to a user equipment to enable or disable detection of the auxiliary cell search signal.

2. The method of claim 1, wherein n3 is predefined and wherein n3 is different from n1.

3. The method of claim 1, wherein the auxiliary PSS occupies a different number of subcarriers compared to the default PSS.

4. The method of claim 1, wherein the network element further exchanges information with a neighboring network element about the auxiliary cell search signal.

5. The method of claim 1, wherein the auxiliary PSS comprises at least partially the same sequence as the default PSS.

6. The method of claim 1, wherein the auxiliary PSS comprises a Zadoff-Chu sequence generated from a different root index than the default PSS.

7. The method of claim 1, wherein the auxiliary SSS utilizes a different sequence from the default SSS.

8. A method at a user equipment ('UE') operating in a wireless network, the method comprising:
    detecting, by the UE, a default cell search signal, the default cell search signal comprising a default Primary Synchronization Signal ('PSS') at symbol n1 of a first time slot and a default Secondary Synchronization Signal ('SSS') at symbol n2 of the first time slot, wherein (n2−n1) is equal to k;
    detecting, by the UE, an auxiliary cell search signal, the auxiliary cell search signal comprising an auxiliary Synchronization Signal, the auxiliary Synchronization Signal including an auxiliary PSS at symbol n3 of a second time slot and an auxiliary SSS at subframe n4 of the second time slot, wherein (n3−n4) is equal to k; and
    utilizing, by the UE, information within the auxiliary cell search signal to detect a cell for the wireless network.

9. The method of claim 8, wherein the auxiliary cell search signal is located at a predetermined location within a radio frame.

10. The method of claim 8, further comprising detecting a cell for the wireless network using both the detected auxiliary cell search signal and the default cell search signal for decoding.

11. The method of claim 8, wherein the detecting is performed only upon receipt of explicit signaling.

12. The method of claim 8, wherein the explicit signaling is radio resource control signaling.

13. The method of claim 8, wherein the auxiliary PSS occupies a different number of subcarriers compared to the default PSS.

14. The method of claim 8, wherein the auxiliary PSS comprises at least partially the same sequence as the default PSS.

15. The method of claim 8, wherein the auxiliary PSS comprises a Zadoff-Chu sequence generated from a different root index than the default PSS.

16. The method of claim 8, wherein the auxiliary SSS utilizes a different sequence from the default SSS.

17. A network element operating in a wireless network, comprising:
    a processor; and
    a communications subsystem,
    wherein the processor and communications subsystem cooperate to:
        transmit a default cell search signal, the default cell search signal comprising a default Synchronization Signal including a default Primary Synchronization Signal ('PSS') transmitted at symbol n1 of a first time slot and a default Secondary Synchronization Signal ('SSS') transmitted at a symbol n2 of the first time slot, wherein (n2−n1) is equal to k;
        transmit an auxiliary cell search signal, the auxiliary cell search signal comprising an auxiliary Synchronization Signal including an auxiliary PSS transmitted at symbol n3 of a second time slot and an auxiliary SSS transmitted at symbol n4 of the second time slot, wherein (n3−n4) is equal to k
        receive, at the network element, communication signals from a user equipment in response to the default cell search signal and the auxiliary cell search signal wherein the network element further signals to a user equipment to enable or disable detection of the auxiliary cell search signal.

18. The network element of claim 17, wherein transmitting the auxiliary PSS comprises transmitting the auxiliary PSS in a same sub-frame as a default cell search signal.

19. The network element of claim 17, wherein n3 is predetermined, and wherein n3 is different from n1.

20. The network element of claim 17, wherein the auxiliary PSS occupies a different number of subcarriers compared to the default PSS.

21. The network element of claim 17, wherein the auxiliary PSS comprises at least partially the same sequence as the default PSS.

22. The network element of claim 17, wherein the auxiliary PSS comprises a Zadoff-Chu sequence generated from a different root index than the default PSS.

23. The network element of claim 17, wherein the auxiliary SSS utilizes a different sequence from the default SSS.

* * * * *